(12) United States Patent
Zhu et al.

(10) Patent No.: US 11,142,639 B2
(45) Date of Patent: *Oct. 12, 2021

(54) POLYURETHANE-POLYORGANOSILOXANE COPOLYMER AND METHOD FOR ITS PREPARATION

(71) Applicant: Dow Silicones Corporation, Midland, MI (US)

(72) Inventors: Bizhong Zhu, Midland, MI (US); Martin Grasmann, Midland, MI (US); Vinita Pandit, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 378 days.

This patent is subject to a terminal disclaimer.

(21) Appl. No.: 16/319,498

(22) PCT Filed: Aug. 18, 2017

(86) PCT No.: PCT/US2017/047466
§ 371 (c)(1),
(2) Date: Jan. 22, 2019

(87) PCT Pub. No.: WO2018/052644
PCT Pub. Date: Mar. 22, 2018

(65) Prior Publication Data
US 2021/0230423 A1   Jul. 29, 2021

Related U.S. Application Data

(60) Provisional application No. 62/396,323, filed on Sep. 19, 2016.

(51) Int. Cl.
| C08L 75/04 | (2006.01) |
| C08G 18/12 | (2006.01) |
| C08G 18/24 | (2006.01) |
| C08G 18/32 | (2006.01) |
| C08G 18/48 | (2006.01) |
| C08G 18/61 | (2006.01) |
| C08G 18/67 | (2006.01) |
| C08G 18/73 | (2006.01) |
| C08G 18/75 | (2006.01) |
| C08G 18/76 | (2006.01) |
| C08G 18/81 | (2006.01) |
| C08G 77/16 | (2006.01) |
| C08G 77/28 | (2006.01) |
| C08K 5/132 | (2006.01) |
| C08L 83/08 | (2006.01) |

(52) U.S. Cl.
CPC .............. *C08L 75/04* (2013.01); *C08G 18/12* (2013.01); *C08G 18/246* (2013.01); *C08G 18/3206* (2013.01); *C08G 18/4833* (2013.01); *C08G 18/61* (2013.01); *C08G 18/6715* (2013.01); *C08G 18/73* (2013.01); *C08G 18/755* (2013.01); *C08G 18/7621* (2013.01); *C08G 18/7657* (2013.01); *C08G 18/8166* (2013.01); *C08G 77/16* (2013.01); *C08G 77/28* (2013.01); *C08K 5/132* (2013.01); *C08L 83/08* (2013.01); *C08G 2170/00* (2013.01); *C08L 2312/00* (2013.01)

(58) Field of Classification Search
CPC .................... C08G 18/671; C08G 18/6715
See application file for complete search history.

(56) References Cited

U.S. PATENT DOCUMENTS

| 3,159,601 | A |   | 12/1964 | Ashby |
| 3,220,972 | A |   | 11/1965 | Lamoreaux |
| 3,296,291 | A |   | 1/1967 | Chalk et al. |
| 3,419,593 | A |   | 12/1968 | Willing |
| 3,516,946 | A |   | 6/1970 | Modic |
| 3,814,730 | A |   | 6/1974 | Karstedt |
| 3,872,152 | A | * | 3/1975 | Kehr .................. C08G 18/6745 560/26 |
| 3,931,287 | A | * | 1/1976 | Kehr .................... C07D 213/30 560/26 |
| 3,989,668 | A |   | 11/1976 | Lee et al. |
| 4,122,029 | A |   | 10/1978 | Gee et al. |
| 4,123,421 | A | * | 10/1978 | Cowell ............. C08G 18/3275 528/65 |
| 4,684,538 | A |   | 8/1987 | Klemarczyk |
| 4,766,176 | A |   | 8/1988 | Lee et al. |
| 4,784,879 | A |   | 11/1988 | Lee et al. |
| 4,793,555 | A |   | 12/1988 | Lee et al. |
| 4,840,796 | A |   | 6/1989 | Sweet et al. |
| 4,929,669 | A |   | 5/1990 | Jensen |
| 4,951,657 | A |   | 8/1990 | Pfister et al. |
| 5,017,654 | A |   | 5/1991 | Togashi et al. |
| 5,036,117 | A |   | 7/1991 | Chung et al. |

(Continued)

FOREIGN PATENT DOCUMENTS

| CA | 2585933 | 4/2007 |
| CN | 201333128 | 10/2009 |

(Continued)

OTHER PUBLICATIONS

Google Translation of WO 2013011691 (Year: 2013).*
Manriquez, "Evaluation of a New Silicone Adhesive Tape among Clinicians Caring for Patients with Fragile or At-Risk Skin", 2014, p. 163-170, Lippincott Williams & Wilkins.
Souliotis, "A cost and clinical effectiveness analysis among moist wound healing dressings versus traditional methods in home care patients with pressure ulcers", 2016, p. 596-601.
Mikhailova, "Heat-Resistant and Anti-Corrosion Urethane-Silicone-based Coatings", 2012, p. 197-208.

(Continued)

*Primary Examiner* — Michael M Dollinger
(74) *Attorney, Agent, or Firm* — Catherine U. Brown

(57) ABSTRACT

A polyurethane-polyorganosiloxane copolymer and methods for its preparation are disclosed. The copolymer has polyfunctional end groups, which render it crosslinkable by multiple crosslinking reactions.

4 Claims, No Drawings

(56) References Cited

U.S. PATENT DOCUMENTS

| | | |
|---|---|---|
| 5,075,399 A | 12/1991 | Ahmed et al. |
| 5,082,886 A | 1/1992 | Jeram et al. |
| 5,155,149 A | 10/1992 | Atwater et al. |
| 5,175,325 A | 12/1992 | Brown et al. |
| 5,189,133 A * | 2/1993 | Meixner ............ C08G 18/4833 528/49 |
| 5,247,047 A * | 9/1993 | Hosogane .......... C07D 207/452 525/419 |
| 5,258,211 A | 11/1993 | Momii et al. |
| 5,356,706 A | 10/1994 | Shores |
| 5,387,417 A | 2/1995 | Rentsch |
| 5,574,122 A | 11/1996 | Yeske et al. |
| 5,643,581 A | 7/1997 | Mougin et al. |
| 5,756,572 A | 5/1998 | Sweet et al. |
| 5,811,487 A | 9/1998 | Schulz, Jr. et al. |
| 5,910,536 A * | 6/1999 | Kydonieus ............ C08G 18/10 524/590 |
| 5,919,441 A | 7/1999 | Mendolia et al. |
| 5,919,884 A | 7/1999 | Fink et al. |
| 5,981,680 A | 11/1999 | Petroff et al. |
| 5,986,018 A | 11/1999 | Yamaguchi et al. |
| 5,998,694 A | 12/1999 | Jensen et al. |
| 6,051,216 A | 4/2000 | Barr et al. |
| 6,150,476 A * | 11/2000 | Dvorchak .......... C08G 18/6715 525/454 |
| 6,524,564 B1 | 2/2003 | Kim et al. |
| 6,528,121 B2 | 3/2003 | Ona et al. |
| 6,632,537 B2 | 10/2003 | Shores |
| 6,746,765 B1 | 6/2004 | Fattman |
| 6,858,218 B2 | 2/2005 | Lai et al. |
| 6,884,853 B1 | 4/2005 | Asaoka et al. |
| 6,916,464 B2 | 7/2005 | Hansenne et al. |
| 7,074,873 B2 | 7/2006 | Lai et al. |
| 7,423,074 B2 | 9/2008 | Lai et al. |
| 7,452,956 B2 | 11/2008 | Cheng et al. |
| 7,914,160 B2 | 3/2011 | Sugano |
| 8,377,425 B2 | 2/2013 | Fleissman et al. |
| 8,507,081 B2 | 8/2013 | Strobech et al. |
| 8,760,100 B2 | 6/2014 | Shafer et al. |
| 8,785,587 B2 | 7/2014 | Wagner et al. |
| 8,877,885 B2 | 11/2014 | Vyakaranam et al. |
| 9,492,171 B2 | 11/2016 | Patenaude |
| 9,688,879 B2 | 6/2017 | Chen et al. |
| 9,976,041 B2 | 5/2018 | Fu et al. |
| 10,092,441 B2 | 10/2018 | Lee |
| 10,369,096 B2 | 8/2019 | Sakamoto et al. |
| 2002/0040202 A1 | 4/2002 | Levin |
| 2002/0132909 A1 | 9/2002 | Klanica et al. |
| 2002/0198280 A1 | 12/2002 | Baba et al. |
| 2003/0072730 A1 | 4/2003 | Toumilhac |
| 2003/0142526 A1 | 7/2003 | Nakahara et al. |
| 2003/0170188 A1 | 9/2003 | Ferrari et al. |
| 2003/0235552 A1 | 12/2003 | Yu |
| 2003/0235553 A1 | 12/2003 | Lu et al. |
| 2004/0091692 A1 | 5/2004 | Parrinello et al. |
| 2004/0180032 A1 | 9/2004 | Manelski et al. |
| 2004/0254325 A1 | 12/2004 | Kuepfer et al. |
| 2005/0048104 A1 | 3/2005 | Venkatraman et al. |
| 2005/0163978 A1 | 7/2005 | Strobech et al. |
| 2005/0238611 A1 | 10/2005 | Rando et al. |
| 2006/0036055 A1 | 2/2006 | Schafer et al. |
| 2006/0142526 A1 | 6/2006 | Lai et al. |
| 2006/0247403 A1 | 11/2006 | Nguyen-Kim et al. |
| 2007/0027285 A1 | 2/2007 | Gunatillake et al. |
| 2007/0071700 A1 | 3/2007 | Abhimanyu Patil et al. |
| 2007/0093618 A1 | 4/2007 | Cheng et al. |
| 2007/0123641 A1 * | 5/2007 | Belelie ............... C08G 18/3206 524/589 |
| 2007/0154440 A1 | 7/2007 | Fleissman et al. |
| 2007/0172518 A1 | 7/2007 | Raul et al. |
| 2008/0027366 A1 | 1/2008 | Da Silva Macedo, Jr. |
| 2009/0105670 A1 | 4/2009 | Bentley et al. |
| 2010/0098648 A1 | 4/2010 | Yu |
| 2011/0034847 A1 | 2/2011 | Bougherara |
| 2014/0142490 A1 | 5/2014 | Johannison |
| 2014/0323941 A1 | 10/2014 | Lee |
| 2015/0031797 A1 | 1/2015 | Onodera et al. |
| 2015/0086713 A1 | 1/2015 | Chen et al. |
| 2015/0313593 A1 | 11/2015 | Patenaude |
| 2017/0319463 A1 | 11/2017 | Sakamoto et al. |
| 2018/0009997 A1 | 1/2018 | Bhagwagar et al. |
| 2018/0023245 A1 | 1/2018 | Dams et al. |
| 2020/0002460 A1 | 1/2020 | Zhu et al. |

FOREIGN PATENT DOCUMENTS

| | | | |
|---|---|---|---|
| CN | 202283306 | 6/2012 | |
| CN | 102757705 | 10/2012 | |
| CN | 204864218 | 12/2015 | |
| CN | 103937437 | 8/2016 | |
| DE | 69817234 | 5/2014 | |
| EP | 0347895 | 12/1989 | |
| EP | 1266647 | 12/2002 | |
| EP | 1266648 | 12/2002 | |
| EP | 1266653 | 12/2002 | |
| EP | 3127931 | 8/2017 | |
| WO | 2003105789 | 12/2003 | |
| WO | 2003106614 | 12/2003 | |
| WO | 2004000247 | 12/2003 | |
| WO | 2004054523 | 7/2004 | |
| WO | 2004054524 | 7/2004 | |
| WO | 2004060101 | 7/2004 | |
| WO | 2007092350 | 8/2007 | |
| WO | 2008088491 | 7/2008 | |
| WO | 2013011691 | 1/2013 | |
| WO | 2013030580 | 3/2013 | |
| WO | 2014116281 | 7/2014 | |
| WO | 2015075448 | 5/2015 | |
| WO | 2015097064 | 7/2015 | |
| WO | 2015152110 | 10/2015 | |
| WO | WO-2015152110 A1 * | 10/2015 | ......... C08G 18/6725 |
| WO | 2018052645 | 3/2018 | |
| WO | 2018052647 | 3/2018 | |

OTHER PUBLICATIONS

Pergal, "Microstructure and properties of poly(urethane-siloxane)s based on hyperbranched polyester of the fourth pseudo generation", Progress in Organic Coatings, 2013, p. 743-756.

Ioan, "Dynamic-mechanical and differential scannig calorimetry measurements on crosslinked poly(ester-siloxanes)-urethanes", Polymer 42, 2001, p. 3633-3639.

Kozakiewicz, "Water-cured poly(urethane-urea)s containing soft segments originating from siloxane/carbonate macrodiols", Polimery, 2012, p. 791-798.

Klode, "Investigation of adhesion of modern wound dressings: a comparative analysis of 56 different wound dressings", 2011, p. 933-939.

Pergal, "Poly(urethane-siloxane)s based on hyperbranched polyester as crosslinking agent: synthesis and characterization", Journal of the Serbian Chemical Society, 2012, p. 919-935.

Balaban, "The effect of polar solvents on the synthesis of poly(urethane-urea-siloxane)s", Journal of the Serbian Chemical Society, 2012, p. 1457-1481.

Dolmaire, "Modification of a Hydrophilic Linear Polyurethane by Crosslinking with a Polydimethylsiloxane. Influence of the Crosslink Density and of the Hydrophobic/Hydrophilic Balance on the Water Transport Properties." Journal of Polymer Science, vol. 44, p. 48-61.

Ekin, "Combinatorial and High-Throughput Screening of the Effect of Siloxane Composition on the Surface Properties of Crosslinked Siloxane-Polyurethane Coatings" J. Comb. Chem. 2007, 9, 178-188.

Pieper, "Combinatiorail approach to study the effect of acrylic polyol composition on the properties of crosslinked siloxane-polyurethane fouling-release coatings" J. Coat. Technol. Res., 4 (4) 453-461, 2007.

Yang, "Preparation and Surface Properties of Silicone-Modified Polyester-Based Polyurethane Coats", JCT Research, vol. 3, No. 4, Oct. 2006.

(56) References Cited

OTHER PUBLICATIONS

Oktay, "Polydimethylsiloxane (PDMS)-based antibacterial organic-inorganic hybrid coatings" J. Coat. Technol. Res., 10 (6) 785-798, 2013.
Young-Hee, "Synthesis and Properties of Waterborne Poly(urethaneurea)s Containing Polydimethylsiloxane" J. App. Polym. Sci., 2010.
Jaing, "Moisture-Cured Polyurethane/Polysiloxane Copolymers: Effects of the Structure of Polyester Diol and NCO/OH Ratio" J. App. Polym. Sci., 2008.
Zhu, "Synthesis and Thermal Properties of Polyurethane-Polysiloxane Crosslinked Polymer Networks" J. App. Poly. Science, 2003.
Chung, "Characterization and low temperature test of the flexibly crosslinked polyurethane copolymer by poly (dimethylsiloxane)" High Performance Polymers, 24(3), 200-209.
Dzunuzovic, "Synthesis and swelling behavior of polyurethane networks based on hyperbranched polymer" Hem Ind. 65 (6) 637-644 (2011).
Pergal, "Study on the morphology and thermomechanical properties of poly(urethane-siloxane) networks based on hyperbranched polyester" Hem. Ind. 67(6) 871-879 (2013).
Dzunuzovic, "Investigation of the Morphology and Surface Properties of Crosslinked Poly(Urethane-Ester-Siloxane)s" Hem. Ind. 66 (6) 813-821 (2012). English Summary.
Pergal, "Surface and thermomechanical characterization of polyurethane networks based on poly(dimethylsiloxane) and hyperbranched polyester" eXPRESS Polymer Letters vol. 7, No. 10 (2013) 806-820.
Pusztai, "The effect of some disiloxane chain extenders on the thermal and mechanical properties of cross-linked poly(siloxane-urethane)s" eXPRESS Polymer Letters vol. 7, No. 5 (2013) 456-470.
Chein-Hong Lin, "Novel silicone hydrogel based on PDMS and PEGMA for contact lens application" Colloids and Surfaces B: Biointerfaces 123 (2014) 986-994.
Chien-Hong Lin, "Hemocompatibility and cytocompatiability of styrenesulfonate-grafted PDMS-polyurethane-HEMA hydrogel" Colloids and Surfaces B: Biointerfaces 70 (2009) 132-141.
Ching-Hsien Chang, "Designed drug-release systems having various breathable polyurethane film-backed hydrocolloid acrylated adhesive layers for moisture healing" 2081-2088.
Borde, "Increased water transport in PDMS silicone films by addition of excipients" Acta Biomaterialia 8 (2012) 579-588.
Chen-Chi M. Ma, "Intermolecular and Intramolecular Hydrogen Bonding of Poly(dimethylsiloxane)urethane-Graft_Poly(methylmethacrylate) Copolymers Based on 2,4-TDI and m-XDI" J. App. Polym. Sci, 2002, 962-972.
Search report from corresponding Japan 2019-512298 application, dated Jul. 13, 2020.
Delvalle, Cindy, et. al., "Personal Care Applications for Phenylsilsesquioxane Resins," IP.com, 2016, No. IPCOM000248667D.
Fang, et al., "New formulations capabilities with three new silicone resin flake products", IP.com Prior Art Database Technical Disclosure.
Ferris, et al, "Synthesis of Functional Sugar-Based Polyurethanes" Macromlecular Chemistry and Physics., vol. 213, No. 5, Mar. 16, 2012, pp. 480-488, XP055452383 DE IDDS: 1022-1352, DOI: 10.1002/macp.201100672 abstract.
Garaud, et al., "A Second Generation Silicone Acrylate for us in Beauty Care Applications", IP.com Prior Art Database Technical Disclosure.
Klode, et al., "Investigation of adhesion of modem wound dressings: a comparative analysis of 56 different wound dressings", Journal of European Academy of Dermatology and Venereology, 2011, 25, pp. 933-939.
Krawczyk, Tobias, "Siloxane modification of polyurethane resins for application in coatings to improve the properties of the film" Master's thesis.
Yuan, et al., "Allyl ether Modified UV Curable Polyurethane-acrylate Resins", Chinese Journal of Applied Chemistry, vol. 20, No. 8, Aug. 2003.

* cited by examiner

POLYURETHANE-POLYORGANOSILOXANE COPOLYMER AND METHOD FOR ITS PREPARATION

CROSS REFERENCE TO RELATED APPLICATIONS

This application is a U.S. national stage filing under 35 U.S.C. § 371 of PCT Application No. PCT/US2017/047466 filed on 18 Aug. 2017, currently pending, which claims the benefit of U.S. Provisional Patent Application No. 62/396,323 filed 19 Sep. 2016 under 35 U.S.C. § 119 (e). PCT Application No. PCT/US2017/047466 and U.S. Provisional Patent Application No. 62/396,323 are hereby incorporated by reference.

TECHNICAL FIELD

This invention relates to a polyurethane-polyorganosiloxane copolymer and method for its preparation. The polyurethane-polyorganosiloxane copolymer is crosslinkable and can be used in a crosslinkable composition to form an adhesive.

BACKGROUND

Polysiloxane prepolymers that are useful for forming biomedical devices, particularly ophthalmic devices including contact lenses, intraocular lenses and ophthalmic implants have been disclosed. Copolymers formed from the prepolymers, especially hydrogel copolymers have also been disclosed. Polysiloxane-based prepolymers with urea or urethane linkages have been disclosed as potential silicone-containing monomers for silicone hydrogels.

Problem to be Solved

However, there is an industry need to provide polyurethane-polyorganosiloxane copolymers that are easier to synthesize than existing copolymers, and/or have improved crosslinking ability, and/or have novel polymer architecture to afford performance not attainable before.

SUMMARY OF THE INVENTION

A polyurethane-polyorganosiloxane copolymer comprises units of formulae:

where each $R^U$ is independently a monovalent unsaturated hydrocarbon group; each $R^D$ is independently a divalent hydrocarbon group or a divalent halogenated hydrocarbon group; each $R^M$ is independently a monovalent hydrocarbon group or a monovalent halogenated hydrocarbon group; each $R^P$ is a hydrocarbon group that is divalent, trivalent, or tetravalent or a halogenated hydrocarbon group that is divalent, trivalent, or tetravalent; each $R^T$ is independently hydrogen or a monovalent hydrocarbon group; each subscript b is independently 0 to 1,000,000; subscript c is 0 to 200,000, subscript i is 0 to 200,000, subscript w1 is 0 to 200,000, subscript w2 is 0 to 200,000, subscript w3 is 0 to 200,000, subscript w4 is 0 to 200,000, and a quantity (c+i+w1+w2+w3+w4)≥1; subscripts d, e, and h depend on the molecular weight of one of the siloxane segments in the copolymer and are without limit, only bound by the molecular weights reachable by the state of the art of the silicone synthesis chemistry, however subscript d may be 0 to 1,000,000; subscript e may be 0 to 1,000,000; subscript h may be 0 to 1,000,000, and a quantity (d+e+h)≥1; subscript f is 1 to 1,500,000; subscript g is 0 to 500,000, subscript k is to 500,000, and a quantity (g+k)≥1; subscript j≥0; each X is independently nitrogen, oxygen, or sulfur; subscript l=0 or 1 when X is nitrogen, and subscript l=1 when X is oxygen or sulfur; subscript m=1 when X is nitrogen and subscript l=1, and subscript m=0 when X is oxygen or sulfur; subscript o=0 when X is oxygen or sulfur, and subscript o=1 when X is nitrogen; each subscript q is independently greater than 1 and less than or equal to 3; subscript s is 0 to 200,000; subscript v is 0 to 200,000; subscript y1 is 0 to 1,000,000; and subscript y2≥0.

The polyurethane-polyorganosiloxane copolymer may be prepared by a method comprising:
  i) reacting starting materials to prepare a polyurethane-polyorganosiloxane prepolymer, where the starting materials comprise
    a) an isocyanate compound of formula R—(N═C═O)$_p$, where subscript p is 2, 3, or 4 and R is a hydrocarbon group that is divalent, trivalent, or tetravalent or a halogenated hydrocarbon group that is divalent, trivalent, or tetravalent; and;
    b) a polyorganosiloxane selected from b1) a carbinol functional polyorganosiloxane, b2) an amine functional polyorganosiloxane, or a mixture of b1) and b2), where

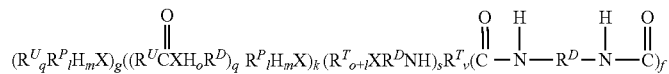

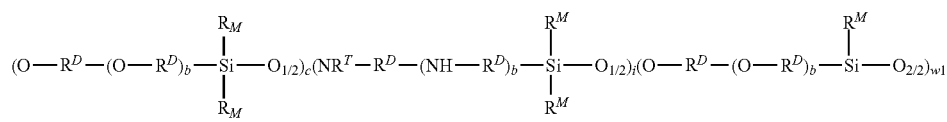

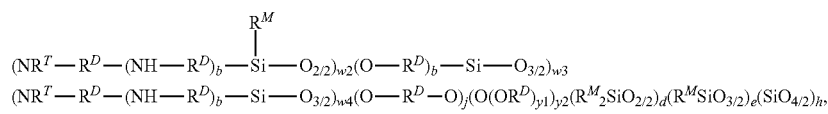

b1) the carbinol functional polyorganosiloxane comprises units of formulae

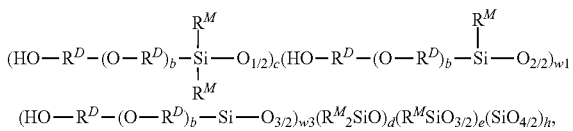

and b2) the amine functional polyorganosiloxane comprises units of formulae

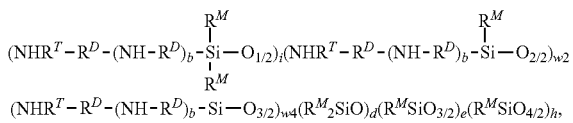

where $R^D$, $R^M$, $R^T$, and subscripts b, c, i, w1, w2, w3, w4, d, e, and h are as described above; and ii) reacting the prepolymer prepared in step i) with c) an endblocker having an average of more than one unsaturated group per molecule; thereby preparing the polyurethane-polyorganosiloxane copolymer.

Alternatively, the polyurethane-polyorganosiloxane copolymer may be prepared by a method comprising:

i) reacting starting materials to prepare an isocyanate functional urea intermediate, where the starting materials comprise a) the isocyanate compound of formula as described above, and c) the endblocker as described above, thereby preparing an isocyanate functional urea intermediate; and ii) reacting the isocyanate functional urea intermediate prepared in step i) with b) the polyorganosiloxane selected from b1) the carbinol functional polyorganosiloxane described above, b2) the amine functional polyorganosiloxane described above, or the mixture of b1) and b2), thereby preparing the polyurethane-polyorganosiloxane copolymer.

DETAILED DESCRIPTION OF THE INVENTION

The polyurethane-polyorganosiloxane copolymer comprises units of formulae:

In the unit formula above, each $R^U$ is independently a monovalent aliphatically unsaturated hydrocarbon group. Each $R^U$ may have 1 to 13 carbon atoms. Each $R^U$ may be alkenyl or alkynyl, as defined below. Alternatively, each $R^U$ may be independently selected from alkenyl groups such as vinyl, allyl, butenyl, or hexenyl; alternatively vinyl or allyl.

Each $R^D$ is independently a divalent hydrocarbon group or a divalent halogenated hydrocarbon group, as defined below. Each $R^D$ may independently have 2 to 13 carbon atoms. Alternatively, each $R^D$ may be selected from alkylene such as ethylene or propylene, arylene such as phenylene, or alkaralkylene. Alternatively, each $R^D$ may be an alkylene group such as ethylene or propylene.

Each $R^M$ is independently a monovalent hydrocarbon group as defined below or a monovalent halogenated hydrocarbon group as defined below. Each $R^M$ may have 1 to 13 carbon atoms. Alternatively, each $R^M$ may be a monovalent hydrocarbon group free of aliphatic unsaturation. For example, each $R^M$ may be independently selected from alkyl such as methyl, ethyl, propyl, butyl or hexyl; aryl such as phenyl, or aralkyl such as tolyl, xylyl or phenyl-methyl. Alternatively, each $R^M$ may be methyl or phenyl, and alternatively each $R^M$ may be methyl.

Each $R^P$ is a divalent, trivalent, or tetravalent hydrocarbon group or a divalent, trivalent or tetravalent halogenated hydrocarbon group. Each $R^P$ may be a divalent, trivalent, or tetravalent hydrocarbon group; alternatively each $R^P$ may be a divalent hydrocarbon group, as described above for each $R^D$.

Each $R^T$ is hydrogen or a monovalent hydrocarbon group. The monovalent hydrocarbon group for $R^T$ may have 1 to 13 carbon atoms. The monovalent hydrocarbon group for $R^T$ is group independently selected from alkyl such as methyl, ethyl, propyl, butyl, or hexyl; aryl such as phenyl; or aralkyl such as tolyl, xylyl, or phenyl-methyl. Alternatively, each $R^T$ may be methyl or phenyl. Alternatively each $R^T$ may be hydrogen or methyl.

Each subscript b is independently greater than or equal to 0. Alternatively, subscript b is 0 to 1,000,000. Alternatively, subscript b is 0 to 200,000. Alternatively, subscript b is 0 to 100,000. Alternatively, subscript b is 0 to 50,000. Alternatively, subscript b is 0 to 10,000. Alternatively, subscript b is 0 to 5,000. Alternatively, subscript b is 0 to 1,000. Alternatively, subscript b is 0 to 500. Alternatively, subscript b is 0 to 100. Alternatively, subscript b is 1 to 100. Alternatively, subscript b is 1 to 50. Alternatively, subscript b is 1 to 20. Alternatively, subscript b is 0 to 1. Alternatively, subscript b=0. Alternatively, subscript b=1. Alternatively,

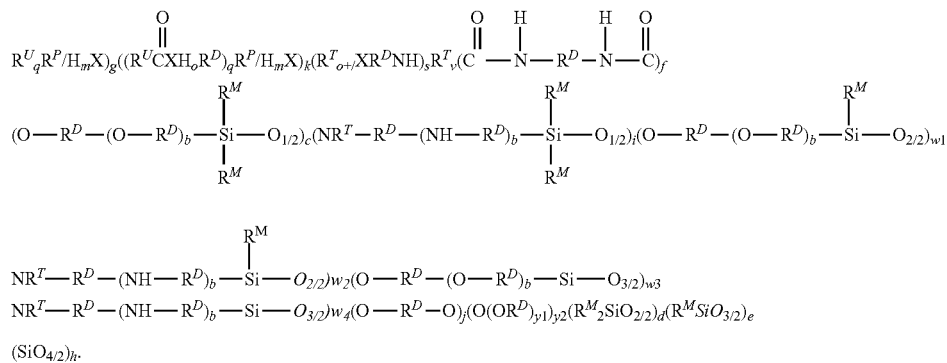

subscript b=2. Alternatively, subscript b=3. Alternatively, subscript b=4. Alternatively, subscript b=5.

Subscript c≥0. Alternatively, subscript c is 0 to 200,000. Alternatively, subscript c is 0 to 100,000. Alternatively, subscript c is 0 to 50,000. Alternatively, subscript c is 0 to 10,000. Alternatively, subscript c is 0 to 5,000. Alternatively, subscript c is 0 to 1,000. Alternatively, subscript c is 0 to 500. Alternatively, subscript c is 0 to 100. Alternatively, subscript c is 0 to 50. Alternatively, subscript c is 0 to 20. Alternatively, subscript c is 0 to 10. Alternatively, subscript c is 1 to 100. Alternatively, subscript c is 1 to 50. Alternatively, subscript c is 1 to 20. Alternatively, subscript c is 1 to 10.

Subscript i≥0. Alternatively, subscript i is 0 to 200,000. Alternatively, subscript i is 0 to 100,000. Alternatively, subscript i is 0 to 50,000. Alternatively, subscript i is 0 to 10,000. Alternatively, subscript i is 0 to 5,000. Alternatively, subscript i is 0 to 1,000. Alternatively, subscript i is 0 to 500. Alternatively, subscript i is 0 to 100. Alternatively, subscript i is 0 to 50. Alternatively, subscript i is 0 to 20. Alternatively, subscript i is 0 to 10. Alternatively, subscript i is 1 to 100. Alternatively, subscript i is 1 to 50. Alternatively, subscript i is 1 to 20. Alternatively, subscript i is 1 to 10.

Subscript w1≥0. Alternatively, subscript w1 is 0 to 200,000. Alternatively, subscript w1 is 0 to 50,000. Alternatively, subscript w1 is 0 to 10,000. Alternatively, subscript w1 is 0 to 5,000. Alternatively, subscript w1 is 0 to 1,000. Alternatively, subscript w1 is 0 to 500. Alternatively, subscript w1 is 0 to 100. Alternatively, subscript w1 is 0 to 50. Alternatively, subscript w1 is 0 to 20. Alternatively, subscript w1 is 0 to 10. Alternatively, subscript w1 is 1 to 100. Alternatively, subscript w1 is 1 to 50. Alternatively, subscript w1 is 1 to 20. Alternatively, subscript w1 is 1 to 10.

Subscript w2≥0. Alternatively, subscript w2 is 0 to 200,000. Alternatively, subscript w2 is 0 to 50,000. Alternatively, subscript w2 is 0 to 10,000. Alternatively, subscript w2 is 0 to 5,000. Alternatively, subscript w2 is 0 to 1,000. Alternatively, subscript w2 is 0 to 500. Alternatively, subscript w2 is 0 to 100. Alternatively, subscript w2 is 0 to 50. Alternatively, subscript w2 is 0 to 20. Alternatively, subscript w2 is 0 to 10. Alternatively, subscript w2 is 1 to 100. Alternatively, subscript w2 is 1 to 50. Alternatively, subscript w2 is 1 to 20. Alternatively, subscript w2 is 1 to 10.

Subscript w3≥0. Alternatively, subscript w3 is 0 to 200,000. Alternatively, subscript w3 is 0 to 50,000. Alternatively, subscript w3 is 0 to 10,000. Alternatively, subscript w3 is 0 to 5,000. Alternatively, subscript w3 is 0 to 1,000. Alternatively, subscript w3 is 0 to 500. Alternatively, subscript w3 is 0 to 100. Alternatively, subscript w3 is 0 to 50. Alternatively, subscript w3 is 0 to 20. Alternatively, subscript w3 is 0 to 10. Alternatively, subscript w3 is 1 to 100. Alternatively, subscript w3 is 1 to 50. Alternatively, subscript w3 is 1 to 20. Alternatively, subscript w3 is 1 to 10.

Subscript w4≥0. Alternatively, subscript w4 is 0 to 200,000. Alternatively, subscript w4 is 0 to 50,000. Alternatively, subscript w4 is 0 to 10,000. Alternatively, subscript w4 is 0 to 5,000. Alternatively, subscript w4 is 0 to 1,000. Alternatively, subscript w4 is 0 to 500. Alternatively, subscript w4 is 0 to 100. Alternatively, subscript w4 is 0 to 50. Alternatively, subscript w4 is 0 to 20. Alternatively, subscript w4 is 0 to 10. Alternatively, subscript w4 is 1 to 100. Alternatively, subscript w4 is 1 to 50. Alternatively, subscript w4 is 1 to 20. Alternatively, subscript w4 is 1 to 10.

A quantity $(c+i+w1+w2+w3+w4) \geq 1$. Alternatively, in one embodiment i=w2=w4=0, and a quantity $(c+w1+w3) \geq 1$, for example, when the polyurethane-polyorganosiloxane copolymer is prepared using a carbinol functional polyorganosiloxane, as described below. In an alternative embodiment, c=w1=w3=0, and a quantity $(i+w2+w4) \geq 1$, for example, when the polyurethane-polyorganosiloxane copolymer is prepared using an amine functional polyorganosiloxane, as described below.

Each X is independently nitrogen (N), oxygen (O), or sulfur (S). Alternatively, X is N or O. Alternatively, each X is N. Alternatively, each X is O.

Subscript m=1 when X is N, and subscript l=1. Subscript m=0 when X is O or S. When X is nitrogen, and subscript l=0; then subscript q is less than or equal to 2, and m is a quantity (2−q).

Subscript l is 0 or 1 when X is N, and subscript l=1 when X is O or S.

Subscript o=0 when X is O or S, and subscript o=1 when X is N.

Subscript q indicates the number of aliphatically unsaturated hydrocarbon groups at a terminus of the polymer. In the formula above, $1 < q \leq 3$. Alternatively, $2 \leq q \leq 3$.

Subscripts d, e, and h depend on the molecular weight of one of the siloxane segments in the copolymer, and are without limit (only bound by the molecular weights reachable by the state of the art of siloxane synthesis chemistry), however subscript d may be 0 to 1,000,000; subscript e may be 0 to 1,000,000; subscript h may be 0 to 1,000,000, and a quantity $(d+e+h) \geq 1$. Subscript d≥0. Alternatively, subscript d>0. Alternatively, subscript d is 0 to 200,000, and alternatively 0 to 100,000, alternatively 0 to 50,000, alternatively 0 to 10,000, alternatively 0 to 5,000, alternatively 0 to 1,000, alternatively 1 to 1,000, alternatively 1 to 500, and alternatively 1 to 200.

Subscript e≥0. Alternatively, subscript e is 0 to 1,000,000. Alternatively, subscript e is 0 to 200,000. Alternatively, subscript e is 0 to 100,000, alternatively 0 to 50,000, alternatively 0 to 10,000, alternatively 0 to 5,000, alternatively 0 to 1,000, alternatively 1 to 1,000, alternatively 1 to 500, and alternatively 1 to 200. Alternatively, subscript e=0.

Subscript f indicates the number of urethane units in the copolymer. Subscript f≥1. Alternatively, subscript f is 1 to 1,500,000. Alternatively, subscript f is 1 to 500,000, alternatively 1 to 200,000, alternatively 1 to 50,000, alternatively 1 to 10,000, alternatively 1 to 5,000, alternatively 1 to 1,000, alternatively 1 to 500, and alternatively 1 to 200.

Subscript g≥0. Alternatively, subscript g is 0 to 500,000. Alternatively, subscript g is 0 to 200,000, alternatively 0 to 100,000, alternatively 0 to 50,000, alternatively 1 to 10,000, alternatively 1 to 5,000, alternatively 1 to 1,000, alternatively 1 to 500, and alternatively 1 to 200.

Subscript k≥0. Alternatively, subscript k is 0 to 500,000. Alternatively, subscript k is 0 to 200,000, alternatively 0 to 100,000, alternatively 0 to 50,000, alternatively 1 to 10,000, alternatively 1 to 5,000, alternatively 1 to 1,000, alternatively 1 to 500, and alternatively 1 to 200. A quantity $(g+k) \geq 1$. Alternatively, $1 \leq (g+k) \leq 1,000,000$. Alternatively $1 \leq (g+k) \leq 500,000$, alternatively $1 \leq (g+k) \leq 50,000$, alternatively $1 \leq (g+k) \leq 10,000$, alternatively $1 \leq (g+k) \leq 5,000$, alternatively $1 \leq (g+k) \leq 500$, alternatively $1 \leq (g+k) \leq 100$.

Subscript h is ≥0. Alternatively, subscript h is 0 to 1,000,000. Alternatively, subscript h is 0 to 200,000, alternatively 0 to 100,000, alternatively 0 to 50,000, alternatively 0 to 10,000, alternatively 0 to 5,000, alternatively 0 to 1,000, alternatively 1 to 1,000, alternatively 1 to 500, and alternatively 1 to 200. Alternatively, subscript h=0.

Subscript j is ≥0. Alternatively, subscript j is 0 to 500,000. Alternatively, subscript j is 0 to 200,000, alternatively 0 to 100,000, alternatively 0 to 50,000, alternatively 1 to 10,000, alternatively 1 to 5,000, alternatively 1 to 1,000, alternatively 1 to 500, and alternatively 1 to 200. Subscript j is >0 when a chain extender is used in making the copolymer.

Subscript s is ≥0. Alternatively, subscript s is 0 to 200,000. Alternatively, subscript s is 0 to 150,000, alternatively 0 to 100,000, alternatively 0 to 50,000, alternatively 1 to 10,000, alternatively 1 to 5,000, alternatively 1 to 1,000, alternatively 1 to 500, and alternatively 1 to 200.

Subscript v is ≥0. Alternatively, subscript v is 0 to 200,000. Alternatively, subscript v is 0 to 150,000, alternatively 0 to 100,000, alternatively 0 to 50,000, alternatively 1 to 10,000, alternatively 1 to 5,000, alternatively 1 to 1,000, alternatively 1 to 500, and alternatively 1 to 200.

Each subscript y1 is independently greater than or equal to 0. Alternatively, subscript y1 is 0 to 1,000,000. Alternatively, subscript y1 is 0 to 200,000. Alternatively, subscript y1 is 0 to 100,000. Alternatively, subscript y1 is 0 to 50,000. Alternatively, subscript y1 is 0 to 10,000. Alternatively, subscript y1 is 0 to 5,000. Alternatively, subscript y1 is 0 to 1,000. Alternatively, subscript y1 is 0 to 500. Alternatively, subscript y1 is 0 to 100. Alternatively, subscript y1 is 1 to 100. Alternatively, subscript y1 is 1 to 50. Alternatively, subscript y1 is 1 to 20. Alternatively, subscript y1 is 0 to 1. Alternatively, subscript y1=0. Alternatively, subscript y1=1. Alternatively, subscript y1=2. Alternatively, subscript y1=3. Alternatively, subscript y1=4. Alternatively, subscript y1=5.

Subscript y2 is ≥0. Alternatively, subscript y2 is 0 to 500,000. Alternatively, subscript y2 is 0 to 200,000, alternatively 0 to 100,000, alternatively 0 to 50,000, alternatively 1 to 10,000, alternatively 1 to 5,000, alternatively 1 to 1,000, alternatively 1 to 500, and alternatively 1 to 200. Subscript y2 is >0 when a chain extender is used in making the copolymer.

Alternatively, when subscripts l=m=k=s=v=l=j=w1=w2=w3=w4=e=h=0, the copolymer may have formula (I):

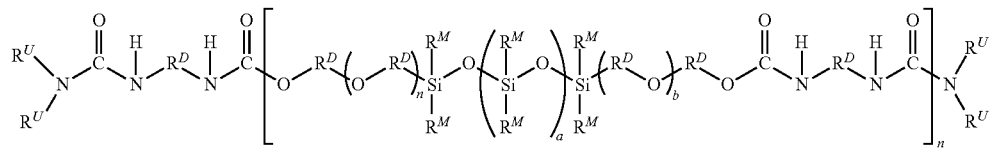

where $R^U$, $R^D$, and $R^M$ are as described above, each subscript a is independently 0 to 1,000,000, and each subscript b is independently greater than or equal to 0, and subscript n is greater than or equal to 1. Alternatively, subscript a is 0 to 200,000, alternatively 0 to 100,000, alternatively 0 to 50,000, alternatively 0 to 10,000, alternatively 0 to 5,000, alternatively 0 to 1,000, alternatively 1 to 1,000, alternatively 1 to 500, alternatively 1 to 200, and alternatively 5 to 150. Each subscript b≥0. Alternatively, subscript b is 0 to 1,000,000. Alternatively, subscript b is 0 to 200,000. Alternatively, subscript b is 0 to 100,000. Alternatively, subscript b is 0 to 50,000. Alternatively, subscript b is 0 to 10,000. Alternatively, subscript b is 0 to 5,000. Alternatively, subscript b is 0 to 1,000. Alternatively, subscript b is 0 to 500. Alternatively, subscript b is 0 to 100. Alternatively, subscript b is 1 to 100. Alternatively, subscript b is 1 to 50. Alternatively, subscript b is 1 to 20. Alternatively, subscript b is 0 to 1. Alternatively, subscript b=0. Alternatively, subscript b=1. Alternatively, subscript b=2. Alternatively, subscript b=3. Alternatively, subscript b=4. Alternatively, subscript b=5. Subscript n is 1 to 1,500,000. Alternatively, subscript n is 1 to 500,000, alternatively 1 to 200,000, alternatively 1 to 50,000, alternatively 1 to 10,000, alternatively 1 to 5,000, alternatively 1 to 1,000, alternatively 1 to 500, and alternatively 1 to 200.

Alternatively, the copolymer may have formula (II):

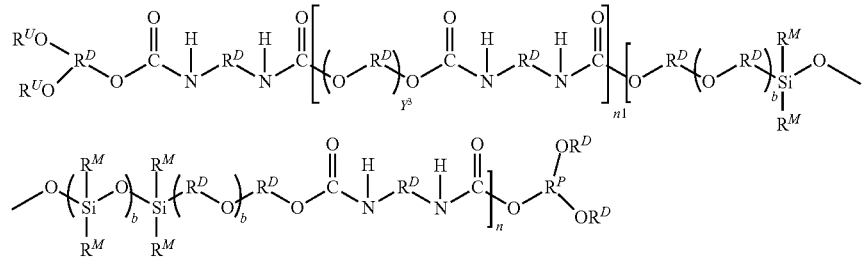

where $R^U$, $R^D$, subscript a, subscript b, subscript n are as described above for formula (I), each subscript y3 is 1 to 200,000, and subscript n1 is 1 to 1,500,000. Alternatively, subscript y3 is 1 to 100,000. Alternatively, subscript y3 is 1 to 50,000. Alternatively, subscript y3 is 1 to 10,000. Alternatively, subscript y3 is 1 to 5,000. Alternatively, subscript y3 is 1 to 1,000. Alternatively, subscript y3 is 1 to 500. Alternatively, subscript y3 is 1 to 100. Alternatively, subscript y3 is 1 to 100. Alternatively, subscript y3 is 1 to 50. Alternatively, subscript y3 is 1 to 20. Alternatively, subscript y3=2. Alternatively, subscript y3=5. Alternatively, subscript y3=9. Alternatively, subscript y3=20. Alternatively, subscript y3=40. Alternatively, subscript n1 is 1 to 500,000. Alternatively, subscript n1 is 1 to 200,000. Alternatively, subscript n1 is 1 to 50,000. Alternatively, subscript n1 is 1 to 10,000. Alternatively, subscript n1 is 1 to 5,000. Alternatively, subscript n1 is 1 to 1,000. Alternatively, subscript n1 is 1 to 500. Alternatively, subscript n1 is 1 to 200.

Method for Making the Copolymer

The polyurethane-polyorganosiloxane copolymer described above may be prepared by a method comprising:

i) reacting starting materials comprising:

a) an isocyanate compound, and b) a polyorganosiloxane, thereby preparing a polyurethane-polyorganosiloxane prepolymer; and ii) reacting the prepolymer prepared in step i) with a starting material comprising c) an endblocker having an average of more than one unsaturated group per molecule; thereby preparing the polyurethane-polyorganosiloxane copolymer.

Alternatively, in a second embodiment, the polyurethane-polyorganosiloxane copolymer may be prepared by a method comprising:

i) reacting starting materials comprising:
  a) an isocyanate compound, and
  c) an endblocker having an average of more than one unsaturated group per molecule, thereby preparing a isocyanate functional urea intermediate; and ii) reacting the polyisocyanate functional urea intermediate prepared in step i) with a starting material comprising b) a polyorganosiloxane; thereby preparing the polyurethane-polyorganosiloxane copolymer.

In each embodiment of the method described above, b) the polyorganosiloxane may be b1) a carbinol functional polyorganosiloxane, b2) an amine functional polyorganosiloxane, or a mixture of both b1) and b2).

Alternatively, in each embodiment of the method described above, d) a chain extender may optionally be added as a starting material in addition to a) the isocyanate, b) the polyorganosiloxane, and c) the endblocker. Starting material d), the chain extender, may be added before, during, and/or after step i) in each embodiment of the method described above. In one embodiment, b) the polyorganosiloxane may be pre-reacted with d) the chain extender before reacting b) the polyorganosiloxane in the method. Alternatively, a) the isocyanate compound may be pre-reacted with d) the chain extender before reacting the a) isocyanate compound in the method.

Starting Material a) Isocyanate Compound

The isocyanate compound has an average of one or more isocyanate groups per molecule. Alternatively, the isocyanate compound may have an average of two or more isocyanate groups per molecule. The isocyanate compound may have formula: $R-(N=C=O)_p$, where R is a hydrocarbon group or a halogenated hydrocarbon group and subscript p is an integer representing the number of isocyanate groups per molecule. Subscript p is greater than or equal to 1. Alternatively, subscript p is 2, 3, or 4; alternatively subscript p is 2 or 3; and alternatively, subscript p is 2. R is a divalent hydrocarbon group when subscript p is 2. R is a trivalent hydrocarbon group when subscript p is 3. R is a tetravalent hydrocarbon group when subscript p is 4.

The isocyanate compound is exemplified by monomeric isocyanates and polymeric isocyanates. Monomeric isocyanates include aromatic diisocyanates such as, meta-tetramethyl xylene diisocyanate (TMXDI), toluene diisocyanate (TDI), phenylene diisocyanate, xylene diisocyanate, 1,5-naphthalene diisocyanate, chlorophenylene 2,4-diisocyanate, bitoluene diisocyanate, dianisidine diisocyanate, toluidine diisocyanate and alkylated benzene diisocyanates; aliphatic and cycloaliphatic isocyanates such as hexamethylene diisocyanate (HDI), hydrogenated methylene diphenyl diisocyanate (HMDI), 1-isocyanato-3-isocyanatomethyl-3,5,5-trimethyl-cyclohexane (isophorone diisocyanate, IPDI), and nonanetriisocyanate (TTI), methylene-interrupted aromatic diisocyanates such as methylene-diphenyl-diisocyanate, especially the 4,4'-isomer (MDI) including alkylated analogs such as 3,3'-dimethyl-4,4'-diphenyl-methane diisocyanate; hydrogenated materials such as cyclohexylene diisocyanate, 4,4'-methylenedicyclohexyl diisocyanate; mixed aralkyl diisocyanates such as the tetramethylxylyl diisocyanates, 1,4-bis(1-isocyanato-1,1'-dimethylmethyl) benzene OCNC(CH$_3$)$_2$C$_6$H$_4$C(CH$_3$)$_2$NCO, and polymethylene isocyanates such as 1,4-tetramethylene diisocyanate, 1,5-pentamethylene diisocyanate, 1,6-hexamethylene diisocyanate (HDI), 1,7-heptamethylene diisocyanate, 2,2,4- and 2,4,4-trimethylhexamethylene diisocyanate, 1,10-decamethylene diisocyanate, and 2-methyl-1,5-pentamethylene diisocyanate; vinylisocyanate; and combinations thereof.

Polymeric isocyanates include dimerized isocyanates uretdiones or uretidinediones and carbodiimide, trimerized isocyanates isocyanurates, iminooxadiazine dione, uretonimine, and linear polymer α-Nylon; and derivatized isocyanates by reacting difunctional or multifunctional isocyanates with various compounds to form allophanate, or biuret compounds, or isocyanate functional urethane or other prepolymers. Some of the polyisocyanates are difunctional, i.e., having 2 isocyanate groups per molecule. Some have more than two isocyanate groups. An example is polymeric diphenylmethane diisocyanate, which is a mixture of molecules with two-, three-, and four- or more isocyanate groups, which may have an average functionality greater than two, commonly 2.7. Isocyanate functional compounds with isocyanate functionality greater than two may act as crosslinking sites. Commercially available isocyanate functional organic compounds are illustrated by Tolonate XIDT 70SB, an isophorone diisocyanate trimer (70% solids, 12.3 wt % NCO) sold by Rhodia (Cranbury, N.J.) and Desmodur N-100 polyisocyanate (available from Mobay Corp.).

Alternatively, a) the isocyanate compound may comprise a blocked isocyanate. The isocyanate group can be blocked by common blocking agents such as phenol, nonyl phenol, butanone oxime, caprolactam, and others. These blocked isocyanates can be released by any conventional means such as heating at a temperature above room temperature to react with chain extenders and polyorganosiloxanes to construct the polyurethane-polyorganosiloxane copolymer.

Starting Material b1) Carbinol-Functional Polyorganosiloxane

The carbinol-functional polyorganosiloxane used to prepare the copolymer described above comprises units of formulae:

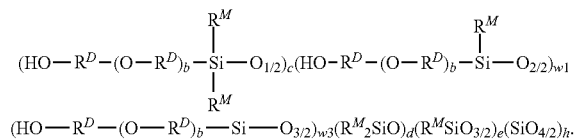

In this unit formula, each $R^M$, $R^D$, subscript b, subscript c, subscript w1, subscript w3, subscript d, subscript e, and subscript h are as described above. The carbinol groups, e.g., hydroxyalkyl groups, can be terminal or pendent on the polyorganosiloxanes, or at both terminal and pendent positions. Alternatively, the carbinol groups may be at terminal positions on the polyorganosiloxane. Examples of carbinol-terminated polyorganosiloxanes are disclosed in WO2008/088491, U.S. Pat. Nos. 6,528,121, and 7,452,956. The carbinol-groups may be at terminal positions, pendent positions, or both terminal and pendent positions in the carbinol-functional polyorganosiloxane. Alternatively, the carbinol groups may be at terminal positions.

Alternatively, b1) the carbinol-functional polyorganosiloxane may comprise an α,ω-difunctional polydiorganosiloxane of formula (III): $R^CR^M{}_2Si-R^{DX}(R^M{}_2SiO)_r-R^{DX}-SiR^M{}_2R^C$, where, each $R^C$ is independently a carbinol functional group of formula HO—$R^D$—(O$R^D$)$_b$— where subscript b, $R^M$ and $R^D$ are as described above, each $R^{DX}$ is independently selected from 0 or a divalent hydrocarbon group described above as $R^D$, and subscript r represents the degree of polymerization of the carbinol-terminated polyorganosiloxane of formula (III). Subscript r>0. Alternatively, subscript r may be 1 to 1,000,000, alternatively 50 to 1,000, and alternatively 200 to 700. Alternatively, subscript r is 0 to 200,000, alternatively 0 to 200,000, alternatively 0 to 100,000, alternatively 0 to 50,000, alternatively 0 to 10,000, alternatively 0 to 5,000, alternatively 0 to 1,000, alternatively 1 to 1,000, alternatively 1 to 500, alternatively 1 to 200, and alternatively 5 to 150. Alternatively, each $R^{DX}$ is 0.

Starting Material b2) Amine-Functional Polyorganosiloxane

The amine functional polyorganosiloxane comprises units of formulae:

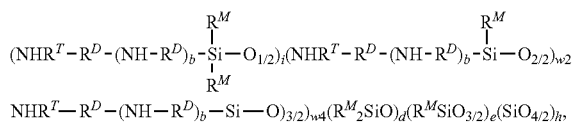

where $R^D$, $R^M$, $R^T$, and subscripts b, d, e, h, and i are as described above. The amine functional groups can be terminal or pendent, or both terminal and pendent.

An exemplary amine terminated polyorganosiloxane comprises a terminal unit of formula

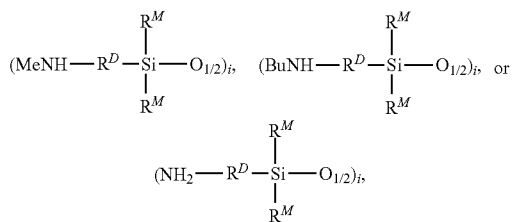

where Me represents a methyl group and Bu represents a butyl group; and further comprises one or more of $(R^M{}_2SiO_{2/2})_d(R^MSiO_{3/2})_e(SiO_{4/2})_h$, where $R^M$, $R^D$, and subscripts I, d, e, and h are as described above.

Starting Material c) Endblocker

The endblocker is a compound having an average of more than one aliphatically unsaturated group per molecule, and the endblocker may be selected from an amine compound, an alcohol, or a thiol compound. The endblocker may be selected from compounds of formulae:

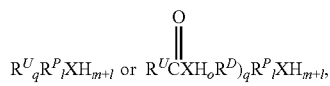

where $R^U$, $R^P$, $R^D$, and X and subscripts q, l, m, and o are as described above. The endblocker is added in an amount sufficient to provide a molar ratio of XH groups on the endblocker to isocyanate groups (XH/N=C=O)<1.

Alternatively, the endblocker may be an amine compound. The amine compound may have formula $R^U{}_zN(R^D)_{2-z}H$, where $R^U$ is as described above, and subscript z 0. Alternatively subscript z is 0 to 1. Alternatively, subscript z=0. Examples of suitable amine compounds for the endblocker include diethyl amine and diallyl amine.

Starting Material d) Chain Extender

The chain extender may be a dialcohol, of formula HO—$R^D$—OH, where $R^D$ is as defined above. Suitable dialcohols include 1,3-butanediol; 1,4-butanediol; 1,6-hexanediol, 1,10-decanediol; 1,6-hexamethylenediol; 2,2-dimethyl-1,3-propanediol; 1,4-cyclohexanedimethylol; 1,1'-isopropylidine-bis-(p-phenylene-oxy)-di-2-ethanol; poly (tetrmethylene ether) glycol; and ethylene glycol. Alternatively, the chain extender may be a diamine containing 2 to 20 carbon atoms e.g., 1,2-diaminoethane; 1,4-diaminobutane; 1,2-propanediamine; hexamethylenediamine; diethylene diamine; 5-amino-1-(aminomethyl)-1,3, 3-trimethylcyclohexane; 4,4'-methylene bis (cyclohexylamine); and ethanol amine. Alternatively, the chain extender may be a dithiol, a dicarboxylic acid, or a diepoxide. Suitable chain extenders are disclosed, for example, in U.S. Pat. Nos. 4,840,796 and 5,756,572.

Starting Material e) Optional Additional Enblocker.

After the reaction step ii) as described above, optionally the reaction product can be treated with an additional end blocker, which is distinct from the endblocker described above as starting material c). This additional end blocker,e), can be such that it leaves an additional reactive group on the copolymer after end blocking reaction, or it leaves an unreactive group on the copolymer after the end blocking reaction. Suitable such end blockers for starting material e) include but are not limited to alcohols such ethanol, propanol, butanol, carboxylic acids such as acetic acids, and alcohols and carboxylic acids containing aliphatic unsaturation. Thio-alcohols, hydroxylamines, glycol, amino acids, and amino sugars are also suitable as additional endblocking agents. When isocyanate is present in molar excess during preparation of the copolymer, unreacted isocyanate can be present in the copolymer. Starting material e), the additional endblocker may be added to react with this residual isocyanate.

Starting Material f) Solvent

A solvent may be added during the method to prepare the polyurethane-polyorganosiloxane copolymer described herein. Any organic compound that will dissolve the polyurethane-polyorganosiloxane copolymer and that is relatively unreactive towards isocyanate, and amine and/or carbinol compounds is suitable as a solvent. Examples include aliphatic hydrocarbons, aromatic hydrocarbons, esters, ethers, ketones, and amides. Exemplary solvents include ethyl acetate, butyl acetate, methyl ethyl ketone, or tetrahydrofuran.

The amount of solvent to be used is dependent on the properties of the polyurethane-polyorganosiloxane copolymer including structure, molecular weight, and the particular method of copolymer preparation, and can be 0 to 99%. Generally for higher molecular weight copolymers especially when a high torque mixing mechanism will not be used, solvent may be added to reduce the viscosity and make the system easier to handle during performance of the method to make the polyurethane-polyorganosiloxane copolymer. If the molecular weight is relatively low and/or high torque mixing equipment such as a twin screw extruder is used, no solvent needs to be used. When solvent is used, the amount may be 0 to 99%, alternatively 0 to 80%, alternatively 1% to 60%, and alternatively 5% to 50%, based on the combined weights of all starting materials used.

The molar ratio among the reactants, i.e. isocyanate compound, polyorganosiloxane, endlocker, and when present chain extender, can vary widely, according to the polyorganosiloxane structure and molecular weight desired, to arrive at the polyurethane-polyorganosiloxane copolymer described by the unit formulae herein. The molar ratio of isocyanate groups of starting material a) to the active hydrogen of carbinol or amine groups on the polysiloxane selected for starting material b) can be 0.1 to 100, alternatively 0.1 to 50, alternatively 0.1 to 10, alternatively 0.1 to 2, alternatively 0.1 to 1.5, alternatively 0.1 to 1.25, alternatively 0.1 to 1.1, alternatively 0.1 to 1.05, alternatively 0.1 to 1.01, alternatively 0.1 to 1, alternatively 0.1 to 0.9, alternatively 0.1 to 0.5, alternatively 0.5 to 50, alternatively 0.5 to 10, alternatively 0.5 to 2, alternatively 0.5 to 1.5, alternatively 0.5 to 1.25, alternatively 0.5 to 1.1, alternatively 0.5 to 1.05, alternatively 0.5 to 1.01, alternatively 0.5 to 1, alternatively 0.5 to 0.9, and alternatively 0.4 to 0.7. When this ratio is <1, the reaction is controlled so that the endblocker is added before all the isocyanate groups are consumed. When this ratio is >1, the endblocker can be added before or after all the active hydrogen on the carbinol or amine groups have been reacted. The molar ratio between the endblocker to the isocyanate can be from 0.001 to 0.99, alternatively 0.001 to 0.8, alternatively 0.01 to 0.8, alternatively 0.01 to 0.6, alternatively 0.01 to 0.5, alternatively 0.01 to 0.4, alternatively 0.01 to 0.3, alternatively 0.01 to 0.2, alternatively 0.01 to 0.1, alternatively 0.05 to 0.8, alternatively 0.05 to 0.6, alternatively 0.05 to 0.5, alternatively 0.05 to 0.4, alternatively 0.05 to 0.3, alternatively 0.05 to 0.2, alternatively 0.05 to 0.1. The molar ratio between the isocyanate groups to the active hydrogen on the hydroxyl or amine groups or other reactive groups on the chain extender can be 1.001 to 1,000,000, alternatively 1.001 to 500,000, alternatively 1.001 to 200,000, alternatively 1.001 to 100,000, alternatively 1.001 to 50,000, alternatively 1.001 to 10,000, alternatively 1.001 to 5,000, alternatively 1.001 to 1,000, alternatively 1.001 to 500, alternatively 1.001 to 100, alternatively 1.001 to 50, alternatively 1.001 to 20, alternatively 1.001 to 10, alternatively 1.001 to 5, alternatively 1.001 to 4, alternatively 1.001 to 3, alternatively 1.001 to 2, alternatively 1.001 to 1.5, alternatively 1.001 to 1.3, alternatively 1.001 to 1.2, alternatively 1.01 to 20, alternatively 1.01 to 10, alternatively 1.01 to 5, alternatively 1.01 to 4, alternatively 1.01 to 3, alternatively 1.01 to 2, alternatively 1.01 to 1.5, alternatively 1.01 to 1.3, and alternatively 1.01 to 1.2.

Starting Material g) Catalyst

Reacting b) the polyorganosiloxane with either the isocyanate compound or the isocyanate functional urea intermediate may be catalyzed by starting material g) a catalyst. Suitable catalysts include tertiary amines and metal salts, such as the salts of tin. Tin compounds are useful as catalysts herein include those where the oxidation state of the tin is either +4 or +2, i.e., tin (IV) compounds or tin (II) compounds. Examples of tin (IV) compounds include stannic salts such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin tris-uberate, dibutyl tin dioctanoate, dibutyl tin diformate, isobutyl tin triceroate, dimethyl tin dibutyrate, dimethyl tin di-neodecanoate, dibutyl tin di-neodecanoate, triethyl tin tartrate, dibutyl tin dibenzoate, butyltintri-2-ethyl hexanoate, dioctyl tin diacetate, tin octylate, tin oleate, tin butyrate, tin naphthenate, dimethyl tin dichloride, a combination thereof, and/or a partial hydrolysis product thereof. Tin (IV) compounds are known in the art and are commercially available, such as Metatin® 740 and Fascat® 4202 from Acima Specialty Chemicals of Switzerland, Europe, which is a business unit of The Dow Chemical Company. Examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof. Other metal salts are also suitable catalysts for this reaction. Examples include zinc salts such as zinc acetate and zinc naphthenate. Salts of lead, bismuth, cobalt, iron, antimony, sodium, such as lead octoate, bismuth nitrate, and sodium acetate can also catalyze this reaction. In certain occasions organomercuric compounds can also be used. Optionally co-catalysts can also be used along with a primary catalyst. And a combination of two or more catalysts can be used, e.g., to provide either faster reaction than achievable with a single catalyst, or a better balanced reaction initiation time and finish time.

Starting Material h) Organic Diol

An organic diol may optionally be added during one or more of the method described above. Suitable include polyalkylene oxide diols such as polyethylene oxide diols, polypropylene oxide diols, and polybutylene oxide diols; or polycarbonate oxide diols. The organic diol may be added to tune the surface energy and/or hydrophilicity of the copolymer. The amount added may be 0 to 75%, alternatively 0 to 50%, alternatively 1 to 25%.

Method Conditions

Steps i) and ii) in each embodiment of the method described above may be performed with or without heating. The temperature for the reaction depends on the selection of starting materials a), b), and c) and whether any of d), e), f), g), and/or h) is present, however, the temperature may range from −20° C. to 150° C.; alternatively 0° C. to 100° C., and alternatively 20° C. to 60° C. at pressure of 1 atmosphere. Pressure under which the method is performed is not critical.

Each embodiment of the method described above may be performed in batch, semi-batch, semi-continuous, or continuous mode in any convenient equipment. When preparing higher molecular weight copolymers (e.g., when higher molecular weight starting materials are used), the method may be performed in an extruder, such as a twin screw extruder.

Crosslinking the Copolymer

The polyurethane-polyorganosiloxane copolymer described above can be crosslinked, by any means that will initiate the reaction of the aliphatic unsaturation. The reaction can be initiated by thermally generated free radicals. It is also ultraviolet radiation crosslinkable via several different means. The aliphatic unsaturation can react with themselves, or additional reactive compounds (crosslinkers) can be added to react with the unsaturation. Suitable crosslinkers include but are not limited to other carbon-carbon unsaturation containing compounds such as acrylates and methacrylates, divinyl and diallyl compounds, and others such as thiols (SH containing), phosphines (PH containing), boranes (BH containing), and silanes (SiH containing). In a first embodiment, a crosslinkable composition comprises: (A) the polyurethane-polyorganosiloxane copolymer described above, and (B) a curing catalyst. The (B) curing catalyst can be (B1) a free radical initiator, or (B2) a hydrosilylation catalyst, depending on the crosslinker being used. The free radical initiator can be a peroxide which can be thermally activated or activated by a reducing agent at room temperature. The peroxide may have formula $R^{MS}$—O—O—$R^{MS}$, where each $R^{MS}$ is independently a saturated monovalent hydrocarbon group or saturated monovalent halogenated hydrocarbon group, such as alkyl as defined below. Examples of peroxides include di-tert-butyl peroxide, bis (tert-butylperoxy)hexane, dicumyl peroxide, and bis(tert-butylperoxyisopropyl)benzene, 1,1-bis(tert-butyl peroxy)-3,3,3-trimethylcyclohexane, 2,5-dimethyl-2,5-di(tert-butylperoxy)hexane, 2,5-dimethyl-2,5-bis(tert-butylperoxy)hexyne-3, (tert-butylperoxy)myristylcarbonate; and mixtures of two or more thereof. Alternatively, the free radical initiator can also be a photo-activated compound. Photo-activated initiators are well known in the literature and any known initiating systems can be used. These can be one component systems or two component systems. One component systems include benzoyl-chromophore based ones, substituted benzoyl-chromophore based ones, hydroxyl alkyl heterocyclic ketones, hydroxyl alkyl conjugated ketones, benzophenone- and thioxanthone-moiety-based systems, benzoyl phosphine oxide derivatives, phosphine oxide derivatives, trichloromethyl triazines, biradical generating ketones, some peroxides and diketones, azides and aromatic bis-azides, some azo, disulfide, disilane, diselenide, diphenylditelluride, digermane, and distannane derivatives, compounds with carbon-germanium, carbon-silicon, carbon-sulfur, sulfur-silicon, sulfur-sulfur, and germanium-silicon cleavable bonds, and others. Two component systems include ketone-hydrogen donor based systems, dye-based system, and various others. Examples of such free radical initiators are known in the art and are commercially available, such as 2-hydroxy-2-methyl-1-phenyl-propan-1-one (commercially available as Darocur 1173). Other commercially available examples include 1-hydroxy-cyclohexyl-phenyl-ketone, benzophenone, 2-hydroxy-1-[4-(2-hydroxyethoxy) phenyl]-2-methyl-1-propanone, methylbenzoylformate, oxy-phenyl-acetic acid 2-[2 oxo-2 phenyl-acetoxy-ethoxy]-ethyl ester, oxy-phenyl-acetic 2-[2-hydroxy-ethoxy]-ethyl ester, alpha-dimethoxy-alpha-phenylacetophenone, 2-benzyl-2-(dimethylamino)-1-[4-(4-morpholinyl) phenyl]-1-butanone, 2-methyl-1-[4-(methylthio) phenyl]-2-(4-morpholinyl)-1-propanone, diphenyl (2,4,6-trimethylbenzoyl) phosphine oxide, phenyl bis (2,4,6-trimethyl benzoyl) phosphine oxide, or bis (eta 5-2,4-cyclopentadien-1-yl), or bis [2,6-difluoro-3-(1H-pyrrol-1-yl) phenyl]titanium. The amount of free radical initiator added to this crosslinkable composition depends on various factors including the other ingredients of the composition, however, the amount may range from 0.01% to 10% based on the weight of the composition. Alternatively the amount is 0.01% to 5%, alternatively 0.05% to 5%, alternatively 0.05% to 3%, alternatively 0.1% to 10%, alternatively 0.1% to 5%, alternatively 0.1% to 3%, The composition may be crosslinked by exposure to ultra violet radiation, visible light, or infrared radiation, depending on where sufficient absorption occurs and how the absorbed energy is transferred to activated the initiator and produce free radicals. Alternatively the initiators can be activated by heat or the activation is assisted by heat in combination with electromagnetic radiation. When crosslinking is activated by heat, additionally many other heat activated free radical initiators can be used. Examples include peroxides and azo compounds. Exemplary peroxides are known in the art, for example, those recited in U.S. Pat. Nos. 4,929,669; 5,082,886; 5,258,211; and 5,919,884. The copolymers can be crosslinked by themselves without additional crosslinkers, or a crosslinker/mixture of crosslinkers can be added to crosslink the copolymers.

Crosslinking may be performed by any convenient means, such as exposing the crosslinkable composition to heat and/or radiation such as electron beam or ultra violet (UV) radiation. When heat is used to crosslink the crosslinkable composition, a temperature from 25 to 200° C. can be used for a duration of less than five seconds to two hours. When electron beam is used to crosslink the crosslinkable composition, an accelerating voltage of 75 kV to 350 kV can be used and a dosage of 5 to 250 kilogray (kGy) is usually sufficient to crosslink the composition. When UV is used, a light source of 200 nm to 450 nm is suitable, and can be generated by a mercury vapor lamp (Type H, D, or V for different wavelengths), a fluorescent lamp, or an UV LED lamp. The power rating of the lamp needed depends on the composition and can be any emitting irradiation at a dosage of at least 0.001 mJ/cm$^2$, alternatively from 0.01 to 2000 mJ/cm$^2$, alternatively from 0.1 to 1000 mJ/cm$^2$, alternatively from 1 to 1000 mJ/cm$^2$, alternatively from 10 to 500 mJ/cm$^2$.

The copolymers can also be crosslinked by reacting the aliphatic unsaturation with a compound with silicon hydride groups through a hydrosilylation reaction. This reaction is usually catalyzed by metal salts and other compounds, amines and other organic bases, peroxides, and/or complexes, and organic peroxides can be used to catalyze hydrosilylation. Hydrosilylation catalysts are known in the art and are commercially available. Such conventional hydrosilylation catalysts can be a metal selected from platinum, rhodium, ruthenium, palladium, osmium, and iridium. Alternatively, the hydrosilylation catalyst may be a compound of such a metal, for example, chloroplatinic acid, chloroplatinic acid hexahydrate, platinum dichloride, and complexes of said compounds with low molecular weight organopolysiloxanes or platinum compounds microencapsulated in a matrix or core/shell type structure. Complexes of platinum with low molecular weight organopolysiloxanes include 1,3-diethenyl-1,1,3,3-tetramethyldisiloxane complexes with platinum. These complexes may be microencapsulated in a resin matrix. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. Nos. 4,766,176 and 5,017,654.

The crosslinkable composition may optionally further comprise (C) a crosslinker in addition to starting materials (A) and (B), described above. The crosslinker may be (C1) an acrylate crosslinker, (C2) a crosslinker containing alkenyl groups (other than in an acrylate group), (C3) a thiol functional crosslinker, or (C4) an SiH containing crosslinker. The acrylate crosslinker and the crosslinker containing other alkenyl groups can contain one or more acrylate or alkenyl (e.g., vinyl) groups per molecule. Examples include but are not limited to methylmethacrylate, n-butyl acrylate, 2-ethyl hexyl methacrylate, ethylene glycol diacrylate, poly (ethylene glycol) diacrylate, neopentyl glycol diacrylate, trimethylolpropane triacrylate, pentaerythritol triacrylate, glycerol propoxylate triacrylate, trimethylolpropane propoxylate triacrylate, trimethylolpropane ethoxylate triacrylate, pentaerythritol tetraacrylate, di(trimethylolpropane) tetraacrylate, divinylbenzene, divinyl sulfone, 1,4-butanediol divinyl ether, ethylene glycol divinyl ether, di- tri-, and poly-ethylene glycol divinyl ether, and styrene.

Suitable thiol functional crosslinkers (C3) are known in the art and are commercially available. They can be organic thiol compounds (SH containing compounds) with an average of two or more SH groups per molecule, or mercapto-functional silanes, siloxanes, polysilanes, polysiloxanes, organosilanes, organosiloxanes, and organopolysiloxanes containing an average of two or more SH groups per molecule. Suitable thiol-ene crosslinkers include: a trimethylsiloxy terminated dimethylsiloxane-methylmercaptopropylsiloxane copolymer with a SH content of 0.35 mol/100 g; a trimethylsiloxy terminated dimethylsiloxane-methylmercaptopropylsiloxane copolymer with a SH content of 0.16 mol/100 g, purchased from Gelest, Inc.; a trimethylsiloxy terminated dimethylsiloxane-methylmercaptopropylsiloxane copolymer with a SH content of 0.05 mol/100 g, purchased from Gelest, Inc.; and a trimethylsiloxy terminated dimethylsiloxane-methylmercaptopropylsiloxane copolymer with a SH content of 0.16 mol/100 g.

Suitable SiH containing crosslinkers (C4) are also known in the literature and commercially available. These generally include silanes, siloxanes, polysilanes, polysiloxanes, organosilanes, organosiloxanes, and organopolysiloxanes containing an average of two or more SiH groups per molecule. Examples include phenylmethylsilane, tetramethyldisilane, phenylsilane, γ,ω-dihydrido-polydimethylsiloxane, poly(dimethyl-methylhydrido)siloxane, hydrogenpolysilsesquioxane, poly(methylhydridosiloxane-co-silphenylene), poly(methylhydridosiloxane-co-silmethylene), and other copolymers of M, and/or D, and/or T, and optionally Q siloxane units which have at least 1 hydride (H) bonded to silicon in the M, and/or D, and/or T units, where M stands for the unit of $R^T3SiO_{1/2}$, D for $R^T2SiO_{2/2}$, T for $RTSiO_{3/2}$, and Q for $SiO_{4/2}$, and $R^T$ is as defined above.

The amount of crosslinker added to the composition depends on various factors including the selection of ingredient (A), the selection of ingredient (B), the selection of crosslinker (C) and whether any other starting materials are present in the crosslinkable composition, however, crosslinker can be added in an amount of 0 to 80%, alternatively 0 to 50%, alternatively 0 to 30%, alternatively 0.5 to 50%, alternatively 0.5 to 30%, alternatively 1% to 50%, alternatively 1% to 30%, alternatively 1% to 20%, alternatively 1% to 10%, alternatively 5% to 50%, alternatively 5% to 30%, and alternatively 5% to 25%.

Examples

Some embodiments of the invention will now be described in detail in the examples below. Reference Examples are not prior art unless so indicated.

TABLE A

Abbreviations

| Abbreviation | Meaning |
|---|---|
| AA | Allyl amine from Aldrich |
| AOH | Allyl alcohol |
| BD | 1,4-butanediol |
| DA | Diallyl amine from 101 |
| TPDA | Trimethylol propane diallylether form Aldrich |
| DMA | N, N-dimethylacetamide |
| EtAc | Ethyl acetate, from Sigma-Aldrich. Anhydrous for polymerization reaction. HPLC grade for dissolving and processing copolymers. |
| EtOH | 200 Proof Ethanol from Aldrich. Used to ensure residual NCO is completely reacted. |
| HDI | Hexamethylene diisocyanate from Acros |
| MDI | Isonate 50 O,P' from The Dow Chemical Company |
| IPDI | Isophorone diisocyanate from Alfa Aesar |
| TDI | Toluene Diisocyanate |
| THF | Tetrahydrofuran |

TABLE A-continued

Abbreviations

| Abbreviation | Meaning |
|---|---|
| DBTL | Dibutyltin dilaurate from Aldrich |
| C16, | Carbinol terminated polydimethylsiloxane having MW of 920 to 924 from Gelest, Product DMS-016 |
| C21 | Carbinol terminated polydimethylsiloxane having MW of 4330 to 4680 from Gelest, Product DMS-021 |
| C23 | Carbinol terminated polydimethylsiloxane having MW of 12000 from Gelest, Product DMS-C23 |
| C62 | Carbinol terminated polydimethylsiloxane with a molecular weight MW of 1670 from Dow Corning |
| PEG400 | Polyethylene glycol having Mw of 400 from 101 |
| FTIR | Fourier Transform Infra-Red |
| NMR | Nuclear Magnetic Resonance |
| MI | Milliliters |
| ° C. | Degrees Celsius |
| Mg | Milligrams |
| Mn | Number average molecular weight determined by NMR |
| NMR | Nuclear magnetic resonance |
| XX-3035 | Trimethylsiloxy terminated dimethylsiloxane-methyl mercaptopropylsiloxane copolymer with a SH content of 0.35 mol/100 g, made in the lab and analyzed by $^{29}Si$ and $^1H$ NMR. |
| SMS 142 | Trimethylsiloxy terminated dimethylsiloxane-methyl-mercaptopropylsiloxane copolymer with a SH content of 0.16 mol/100 g, purchased from Gelest, Inc. |
| SMS 042 | Trimethylsiloxy terminated dimethylsiloxane-methyl-mercaptopropylsiloxane copolymer with a SH content of 0.05 mol/100 g, purchased from Gelest, Inc. |
| 26298-125 SH crosslinker | Trimethylsiloxy terminated dimethylsiloxane-methylmercaptopropylsiloxane copolymer with a SH content of 0.16 mol/100 g, made in the lab and analyzed by $^{29}Si$ and $^1H$ NMR. |
| Darocur 1173 | 2-Hydroxy-2-methyl-1-phenyl-propan-1-one |
| N/A | Not available (not measured) |

Reference Example—General Procedure for Preparing Copolymers

A ml 4 neck flask was placed into a temperature controlled heating block and fitted with mechanical stirrer, thermometer, dropping funnel and reflux condenser.

1) The flask was charged with an a) isocyanate compound and a b) polyorganosiloxane, which were mixed to form a mixture.

2) The mixture was stirred and heated at 60° C., and the progress of the reaction followed by FTIR.

Optionally 3) After a period of time, solvent was added and the reaction cooled to room temperature of 15° C. to below 40° C.

4) An c) endblocker (and optionally e) solvent) were charged to the dropping funnel and added drop-wise to the mixture in the flask, which was then heated for a period of time.

5) The mixture in the flask was cooled to room temperature and filtered through a 0.45 micron filter using Celite® 545 filter aid. The filtrate was transferred into a round flask and volatiles removed with a rotary evaporator (90° C., 1 mbar).

Samples were prepared according to this procedure using starting materials and conditions shown in Table 1.

Reference Examples 2—General Procedure for Preparing Copolymers

A ml 4 neck flask was placed into a temperature controlled heating block and fitted with mechanical stirrer, thermometer, dropping funnel and reflux condenser.

1) The flask was charged with an a) isocyanate compound, an b) endblocker and a c) catalyst, which were mixed to form a mixture.

2) The mixture was stirred and heated at 60° C. for 1 hour, and the progress of the reaction followed by FTIR.

3) After a period of time the reaction was cooled to room temperature of 15° C. to 30° C. and solvent added.

4) A d) polyorganosiloxane and a e) polyethylene glycol (and optionally f) solvent) were charged to the dropping funnel and added drop-wise to the mixture in the flask, which was then heated for a period of time at 60° C.

5) f) EtOH was added to the mixture in the flask, which was then heated to reflux for period of time.

6) The mixture in the flask was cooled to room temperature and filtered through a 0.45 micron filter using Celite® 545 filter aid. The filtrate was transferred into a round flask and volatiles removed with a rotary evaporator (90° C., 1 mbar).

Samples were prepared according to this procedure using starting materials and conditions shown in Table 1.

TABLE 1

Copolymer Preparation

| Example 1 | a) isocyanate compound | b) polyorganosiloxane | Time for heating in step 2) | Optional solvent in step 3) | Endblocker and optional solvent in step 4) | Temperature for heating in step 4) | Time for Heating in step 4) |
|---|---|---|---|---|---|---|---|
| 1 (comparative) $IPDI_nC21_mAA_2$, (n, m) = (2, 1) | 17.8 g IPDI | 187.1 g C21 | 7.5 hours | 100 ml THF | 200 ml of anhydrous THF and 5.7 g of allyl amine | Boiled under reflux | 2 hours |
| 2 $IPDI_nC16_mDA_2$, (n, m) = (14, 13) | 22.23 g IPDI | 87.8 g C16 | 7.5 hours | No step 3) | 120 ml EtAc and 1.94 g diallyl amine | Heated at 70° C. | 2 hours |
| 3 $IPDI_nC21_mDA_2$, (n, m) = (2, 1) | 23.3 g IPDI | 245.5 C21 | 24 hours | 100 ml THF | 200 ml THF and 12.7 g diallyl amine | Boiled under reflux | 2 hours |
| 4 $IPDI_nC23_mAA_2$, (n, m) = (2, 1) (comparative) | 4.4 g IPDI | 120.0 g C23 | 30 hours | 100 ml THF | 200 ml THF and 1.4 g allyl amine | Boiled under reflux | 2 hours |
| 5 (comparative) $IPDI_nC21_mAOH_2$, (n, m) = (3, 2) | 20.0 g IPDI | 260.0 g C21 | 45 hours | No step 3) | 13.9 g allyl alcohol | Heated at 60° C. | 8 hours |
| 6 $HDI_nC16_mDA_2$; (n, m) = (14, 13) | 40.4 g HDI | 211.1 g C16 | 7 hours | No step 3) | 200 ml EtAc and 8.4 g diallyl amine | Heated at 70° C. | 2 hours |
| 7 $H_nC21_mDA_2$; (n, m) = (20, 19) | 4.3 g HDI | 105.2 g C21 | 22 hours | No step 3) | 200 ml EtAc and 0.5 g diallyl amine | Heated at 70° C. | 2 hours |
| 8 $H_nC23_mDA_2$; (n, m) = (5, 4) | 4.8 g HDI | 276.5 g C23 | 73 hours | No step 3) | 300 ml of EtAc and 0.5 g of diallyl amine | Heated at 70° C. | 2 hours |
| 9 $HDI_nC62_mDA_2$; (n, m) = (13, 12) | 10.4 g HDI | 97.9 g C62* | 35 minutes | No step 3) | 120 ml EtAc and 1.2 g diallyl amine | Heated at 70° C. | 2 hours |
| 10 $(DA_2HDI_nC16_m)_2BD_x$; (n, m, x) = (20, 18, 1) | 17.1 g HDI | 84.5 g C16 | 12 hours | No step 3)** | 60 ml of EtAc and 1.9 g of diallyl amine | Heated at 70° C. | 2 hours |
| 11 (comparative) $HDI_nC21_mDA_2$; (n, m) = (3, 2) | 8.1 g HDI | 149.7 g C21 | 21 hours | No step 3) | 150 ml THF and 5.8 g diallyl amine | Boiled under reflux | 2 hours |
| 12 (comparative) $HDI_nC21_mDA_2$; (n, m) = (7, 6) | 7.1 g HDI | 156.0 g C21 | 29 hours | No step 3) | 150 ml THF and 2.3 g diallyl amine | Boiled under reflux | 2 hours |
| 13 (comparative) $HDI_nC16_mDA_2$; (n, m) = (10, 9) | 16.8 g HDI | 83.1 g C16 | 7 hours | No step 3) | 120 ml THF and 3.9 g diallyl amine | Boiled under reflux | 2 hours |
| 14 (comparative) $HDI_nC16_mDA_2$; (n, m) = (15.75, 14.75) | 16.8 g HDI | 87.8 g C16 | 7 hours | No step 3) | 120 ml THF and 1.9 g diallyl amine | Boiled under reflux | 2 hours |
| 15 (comparative) $HDI_nC16_mDA_2$; (n, m) = (16.6, 15.6) | 40.4 g HDI | 210.7 g C16 | 7 hours | No step 3) | 400 ml EtAc and 4.7 g diallyl amine | Heated at 70° C. | 2 hours |
| 16 (comparative) $HDI_nC16_mDA_2$; (n, m) = (15, 14) | 16.8 g HDI | 94.6 g C16 | 7 hours | No step 3) | 120 ml THF and 1.9 g diallyl amine | Boiled under reflux | 2 hours |
| Examples 2 | a) isocyanate compound | b) Endblocker, c) Catalyst | d) polyorganosiloxane | e) polyethylene glycol f) Solvent | Time for Heating in step 4) | f) EtOH | Time for Heating in step 5) |

TABLE 1-continued

Copolymer Preparation

| | a) isocyanate compound | b) Endblocker, c) Catalyst | d) polyorganosiloxane | e) polyethylene glycol f) Solvent | Time for Heating in step 4) | f) EtOH | Time for Heating in step 5) |
|---|---|---|---|---|---|---|---|
| 17 HDI$_n$C62$_m$PEG400$_o$TPDA$_2$; (n, m, o) = (14, 6.5, 6.5) | 16.6 g HDI | 3.2 g TPDA 0.08 g DBTL | 79.8 g C62 | 18.7 g PEG400 100 ml EtAc | 5 hours | 5 g EtOH | 2 hours |
| 18 MDI$_n$C62$_m$PEG400$_o$TPDA$_2$; (n, m, o) = (14.2, 6.6, 6.6) | 22.1 g MDI | 2.8 g TPDA 0.08 g DBTL | 71.6 g C62 | 16.8 g PEG400 100 ml EtAc | 4 hours | 5 g EtOH | 2 hours |

| Examples 2 | a) isocyanate compound | b) Endblocker, c) Catalyst | d) polyorganosiloxane | e) polyethylene glycol f) Solvent | Time for Heating in step 4) | f) EtOH | Time for Heating in step 5) |
|---|---|---|---|---|---|---|---|
| 17 HDI$_n$C62$_m$PEG400$_o$TPDA$_2$; (n, m, o) = (14, 6.5, 6.5) | 16.6 g HDI | 3.2 g TPDA 0.08 g DBTL | 79.8 g C62 | 18.7 g PEG400 100 ml EtAc | 5 hours | 5 g EtOH | 2 hours |
| 18 MDI$_n$C62$_m$PEG400$_o$TPDA$_2$; (n, m, o) = (14.2, 6.6, 6.6) | 22.1 g MDI | 2.8 g TPDA 0.08 g DBTL | 71.6 g C62 | 16.8 g PEG400 100 ml EtAc | 4 hours | 5 g EtOH | 2 hours |

**In example 10, step 3) described above was not practiced. However, a chain extender was added after step 2). 0.46 g of 1,4-butanediol from Aldrich was added and reacted for an additional 3 hours at 60° C.

Table 2 shows the characterization results of the examples in Table 1. The number average molecular weight (Mn) of each copolymer was measured by NMR. $^1$H-NMR analysis (in ppm, solvent CDCl$_3$) and $^{13}$C-NMR analysis (solvent CDCl$_3$) were performed.

TABLE 2

Copolymer Characterization Results

| Example | Molecular Weight (Mn) (g/mol) | $^1$H-NMR analysis | $^{13}$C-NMR analysis |
|---|---|---|---|
| 1 (comparative) | 5200 | Olefinic (5.91-5.79, 5.22-5.10 ppm), NH (4.62-4.38), —CH$_2$OOC (4.20-4.17), —CH$_2$—CH=CH$_2$ (3.80-3.77), —CH (3.64-3.59), —CH$_2$—O— (3.61-3.58), —CH$_2$—O— (3.42-3.39), —CH$_2$—NHCO (2.96-2.89), —CH$_2$— (1.85-1.82, 1.73-1.56), —CH$_3$ (1.04, 0.91), —CH$_2$—Si (0.53-0.48), Si—CH$_3$ (0.09-0.03) | NHC=ONH, NHC=OO (159.52, 158.67, 157.36, 157.28, 156.16), —HC=CH$_2$ (136.40), —HC=CH$_2$ (115.56), —CH$_2$O— (74.40, 69.33), O—CH$_2$—HC=CH$_2$ (68.18), —CH$_2$OOC (64.18), —CH$_2$NHC=ONH (54.46), cyclic —CH$_2$—, —CH— (47.71, 46.73, 45.13, 42.40), —CH$_2$—HC=CH$_2$ (43.24), cyclic C (36.86, 35.39), —CH$_3$ (32.19, 28.06, 23.70), —CH$_2$— (23.87), Si—CH$_2$— (14.44), Si—CH$_3$ (1.49, 1.38, 0.44) |
| 2 | 14100 | Olefinic (5.85-5.73, 5.22-5.15 ppm), NH (4.68-4.40), —CH$_2$OOC (4.00-4.17), —CH$_2$—CH=CH$_2$ (3.86-3.84), —CH (3.81-3.72), —CH$_2$—OH (3.60-3.56), —CH$_2$—NHCO (3.06-2.98), —CH$_2$— (1.73-1.55), —CH$_3$ (1.04, 0.91), —CH$_2$—Si (0.54-0.50), Si—CH$_3$ (0.07-0.02) | NHC=ONH, NHC=OO (158.61, 158.49, 157.32), —HC=CH$_2$ (134.91, 134.81, 134.57), —HC=CH$_2$ (117.07, 117.00), —CH$_2$O— (67.69, 67.46), —CH$_2$OOC (65.31), —CH$_2$NHC=ONH (55.24), cyclic —CH$_2$—, —CH— (50.09, 47.46, 46.75, 42.29), —CH$_2$—HC=CH$_2$ (44.83), cyclic C (36.75, 32.14), —CH$_3$ (35.75, 27.96, 26.69), —CH$_2$— (23.33), Si—CH$_2$— (14.32), Si—CH$_3$ (1.49, 1.38, 0.44) |
| 3 | 5300 | Olefinic (5.85-5.76, 5.21-5.16 ppm), NH (4.82-4.79, 4.54-4.50), —CH$_2$OOC (4.18-4.17), —CH$_2$—CH=CH$_2$ (3.86-3.85), —CH (3.81-3.76), —CH$_2$—O— (3.61-3.58), —CH$_2$—O— (3.43-3.39), —CH$_2$—NHCO (2.98-2.89), —CH$_2$— (1.73-1.70, 1.62-1.56), —CH$_3$ (1.04, 1.01, 0.91, 0.86, 0.84), —CH$_2$—Si (0.53-0.49), Si—CH$_3$ (0.06-0.03) | NHC=ONH, NHC=OO (158.59, 158.50, 157.82, 157.16, 156.96), —HC=CH$_2$ (135.89, 134.98, 134.63), —HC=CH$_2$ (117.02, 116.93), —CH$_2$O— (74.46, 69.38), O—CH$_2$—HC=CH$_2$ (64.40), —CH$_2$OOC (64.17), —CH$_2$NHC=ONH (55.98, 54.72), cyclic —CH$_2$—, —CH— (50.12, 49.71, 47.69, 46.81, 45.03), —CH$_2$—HC=CH$_2$ (42.34), cyclic C (36.74, 35.46), —CH$_3$ (32.16, 28.00, 23.84), —CH$_2$—(23.71), Si—CH$_2$— (14.43), Si—CH$_3$ (1.63-0.44) |
| 4 (comparative) | 19400 | Olefinic (5.91-5.79, 5.22-5.12 ppm), NH (4.58-4.37), —CH$_2$OOC (4.21-4.18), —CH$_2$—CH=CH$_2$ (3.81-3.78), —CH (3.64-3.59), —CH$_2$—O— (3.61-3.58), —CH$_2$—O— (3.45-3.39), —CH$_2$—NHCO (2.95-2.9), —CH$_2$— (1.74-1.57), —CH$_3$ (1.06, 0.92, 0.88, 0.82), —CH$_2$—Si (0.54-0.49), Si—CH$_3$ (0.07-0.05) | NHC=ONH, NHC=OO (159.20, 158.55, 157.22, 156.14), —HC=CH$_2$ (136.37), —HC=CH$_2$ (115.88), —CH$_2$O— (75.53, 69.39), ), O—CH$_2$—HC=CH$_2$ (68.22), —CH$_2$OOC (64.23), —CH$_2$NHC=ONH (54.50), cyclic —CH$_2$—, —CH— (47.79, 46.77, 45.16, 43.50), —CH$_2$—HC=CH$_2$ (42.53), cyclic C (36.86, 35.52), —CH$_3$ (32.22, 28.09, 25.98), —CH$_2$—(23.72), Si—CH$_2$— (14.46), Si—CH$_3$ (1.64-0.47) |
| 5 (comparative) | 9450 | Olefinic (5.96-5.86, 5.32-5.18 ppm), NH (4.83-4.71, 4.55-4.52), —CH$_2$—CH=CH$_2$ (4.55-4.52), —CH$_2$OOC (4.21-4.17), —CH (3.84-3.69), —CH$_2$—O— (3.61-3.58), —CH$_2$—O— (3.43-3.39), —CH$_2$—NHCO (2.92-2.89), —CH$_2$— (1.73-1.69, 1.64-1.56), —CH$_3$ (1.05, 1.04, 0.91, 0.87, 0.83), —CH$_2$—Si (0.53-0.48), Si—CH$_3$ (0.06-0.03) | NHC=ONH, NHC=OO (157.16, 157.01, 155.97), —HC=CH$_2$ (133.38), —HC=CH$_2$ (117.90), —CH$_2$O— (74.43, 69.37), O—CH$_2$—HC=CH$_2$ (65.87), —CH$_2$OOC (64.17), —CH$_2$NHC=ONH (55.25), cyclic —CH$_2$—, —CH— (47.94, 47.44, 46.67, 44.97), —CH$_2$—HC=CH$_2$ (42.20), cyclic C (36.78, 35.41), —CH$_3$ (32.16, 27.97, 23.71), —CH$_2$—(23.61), Si—CH$_2$— (14.44), Si—CH$_3$ (1.61-0.44) |

TABLE 2-continued

Copolymer Characterization Results

| Example | Molecular Weight (Mn) (g/mol) | $^1$H-NMR analysis | $^{13}$C-NMR analysis |
|---|---|---|---|
| 6 | 20700 | Olefinic (5.83-5.73, 5.19-5.13 ppm), NH (4.64, 4.43), —CH$_2$OOC (3.99-3.96), —CH$_2$—CH=CH$_2$ (3.84-3.82), —CH$_2$—OH (3.59-3.56), —CH$_2$—NHCO (3.20-3.11), —CH$_2$— (1.64-1.58, 1.50-1.45, 1.33-1.30), —CH$_2$—Si (0.54-0.49), Si—CH$_3$ (0.07-0.02) | NC=ONH, NHC=OO (158.51, 157.15), —HC=CH$_2$ (134.69), —HC=CH$_2$ (116.88), —CH$_2$OOC (67.51), N—CH$_2$—HC=CH$_2$ (49.71), —CH$_2$NHC=OO CH$_2$NHC=ON (41.09, 40.88), —CH$_2$— (30.47, 30.31, 26.63), —CH$_2$—(23.34), Si—CH$_2$— (14.32), Si—CH$_3$ (1.47-0.42) |
| 7 | 23000 | Olefinic (5.83-5.74, 5.19-5.14 ppm), NH (4.73, 4.43), —CH$_2$OOC (4.20-4.18), —CH$_2$—CH=CH$_2$ (3.84-3.83), —CH$_2$—O— (3.60-3.58), —CH$_2$—O— (3.42-3.39), —CH$_2$—NHCO (3.16-3.11), —CH$_2$— (1.64-1.56, 1.50-1.44, 1.32-1.29), —CH$_2$—Si (0.53-0.48), Si—CH$_3$ (0.10-0.03) | NC=ONH, NHC=OO (158.57, 156.81), —HC=CH$_2$ (133.38), —HC=CH$_2$ (117.90), —CH$_2$O— (74.50, 69.43), —CH$_2$OOC (64.95), N—CH$_2$—HC=CH$_2$ (49.84), —CH$_2$NHC=OO CH$_2$NHC=ON (41.23), —CH$_2$— (30.26, 26.66) —CH$_2$—(23.72), Si—CH$_2$— (14.45), Si—CH$_3$ (1.69-0.47) |
| 8 | 49000 | NC=ONH, NHC=OO (158.56, 156.81), —HC=CH$_2$ (134.77), —HC=CH$_2$ (116.92), —CH$_2$O— (74.47, 69.44), —CH$_2$OOC (64.30), N—CH$_2$—HC=CH$_2$ (49.84), —CH$_2$NHC=OO—CH$_2$NHC=ON (41.20, 40.91), —CH$_2$— (31.16, 30.52, 30.27, 26.62) —CH$_2$—(23.72), Si—CH$_2$— (14.46), Si—CH$_3$ (1.66-0.45 | NC=ONH, NHC=OO (158.56, 156.81), —HC=CH$_2$ (134.77), —HC=CH$_2$ (116.92), —CH$_2$O— (74.47, 69.44), —CH$_2$OOC (64.30), N—CH$_2$—HC=CH$_2$ (49.84), —CH$_2$NHC=OO—CH$_2$NHC=ON (41.20, 40.91), —CH$_2$— (31.16, 30.52, 30.27, 26.62) —CH$_2$—(23.72), Si—CH$_2$— (14.46), Si—CH$_3$ (1.66-0.45 |
| 9 | 21700 | Olefinic (5.83-5.73, 5.19-5.14 ppm), NH (4.74, 4.42), —CH$_2$OOC (4.19-4.17), —CH$_2$—CH=CH$_2$ (3.84-3.82), CH$_2$—OH (3.79-3.78), CH$_2$—CH$_2$—OH (3.52-3.48), —CH$_2$—O— (3.60-3.58), —CH$_2$—O— (3.42-3.39), —CH$_2$—NHCO (3.21-3.11), —CH$_2$— (1.64-1.56, 1.50-1.44, 1.33-1.29), —CH$_2$—Si (0.53-0.48), Si—CH$_3$ (0.09-0.03). | NC=ONH, NHC=OO (158.50, 156.80), —HC=CH$_2$ (134.72), —HC=CH$_2$ (116.87), —CH$_2$O— (74.40, 69.38), —CH$_2$OOC (64.23), N—CH$_2$—HC=CH$_2$ (49.73), —CH$_2$NHC=OO—CH$_2$NHC=ON (41.15, 40.89), —CH$_2$— (31.15, 30.48, 30.21, 26.60) —CH$_2$—(23.69), Si—CH$_2$— (14.41), Si—CH$_3$ (1.64-0.44 |
| 10 | 21900 | Olefinic (5.83-5.73, 5.18-5.14 ppm), NH (4.64, 4.43), —CH$_2$OOC (3.99-3.96), —CH$_2$—CH=CH$_2$ (3.84-3.82), —CH$_2$—OH (3.59-3.56), —CH$_2$—NHCO (3.16-3.11), —CH$_2$— (1.64-1.56, 1.50-1.45, 1.33-1.30), —CH$_2$—Si (0.54-0.49), Si—CH$_3$ (0.06-0.03) | NC=ONH, NHC=OO (158.49, 157.14), —HC=CH$_2$ (134.65), —HC=CH$_2$ (116.87), —CH$_2$OOC (67.49), —CH$_2$—OCO (65.30), N—CH$_2$—HC=CH$_2$ (49.66), —CH$_2$NHC=OOCH$_2$NHC=ON (41.70, 41.09), —CH$_2$— (30.70, 30.30, 26.63, 26.11), —CH$_2$—(23.32), Si—CH$_2$— (14.29), Si—CH$_3$ (1.35-0.40). |
| 11 (comparative) | 10200 | Olefinic (5.83-5.75, 5.20-5.16 ppm), NH (4.75, 4.43), —CH$_2$OOC (4.20), —CH$_2$—CH=CH$_2$ (3.85-3.84), —CH$_2$—O— (3.60), —CH$_2$—O— (3.44-3.40), —CH$_2$—NHCO (3.21-3.13), —CH$_2$— (1.65-1.58, 1.48-1.46, 1.32), —CH$_2$—Si (0.54-0.50), Si—CH$_3$ (0.07-0.04). | N—C=O—NH, NH—C=O-O (158.53, 156.81), —HC=CH$_2$ (134.76), —HC=CH$_2$ (116.90), —CH$_2$O— (74.45, 69.42), —CH$_2$O—CO (64.26), N—CH$_2$—HC=CH$_2$ (49.79), —CH$_2$—NH—C=O—O CH$_2$—NH—C=O—N (41.19, 40.91), —CH$_2$— (30.51, 30.25, 26.63) —CH$_2$—(23.72), Si—CH$_2$— (14.44), Si—CH$_3$ (1.69-0.47). |
| 12 (comparative) | 18400 | Olefinic (5.84-5.75, 5.20-5.15 ppm), NH (4.75, 4.42), —CH$_2$OOC (4.20-4.18), —CH$_2$—CH=CH$_2$ (3.85-3.83), —CH$_2$—O— (3.61-3.59), —CH$_2$—O— (3.43-3.39), —CH$_2$—NHCO (3.21-3.12), —CH$_2$— (1.65-1.57, 1.49-1.44, 1.33-1.29), —CH$_2$—Si (0.53-0.49), Si—CH$_3$ (0.11-0.01). | N—C=O—NH, NH—C=O—O (158.53, 156.81), —HC=CH$_2$ (134.21), —HC=CH$_2$ (116.39), —CH$_2$O— (74.98, 69.64), —CH$_2$O—CO (64.81), N—CH$_2$—HC=CH$_2$ (49.21), —CH$_2$—NH—C=O—O CH$_2$—NH—C=O—N (41.67, 40.82), —CH$_2$— (30.86, 30.72, 26.53) —CH$_2$—(23.59), Si—CH$_2$— (14.35), Si—CH$_3$ (1.68-0.44). |
| 13 (comparative) | 18900 | Olefinic (5.83-5.73, 5.19-5.13 ppm), NH (4.63, 4.43), —CH$_2$OOC (3.99-3.96), —CH$_2$—CH=CH$_2$ (3.84-3.82), —CH$_2$—OH (3.60-3.56), —CH$_2$—NHCO (3.20-3.11), —CH$_2$— (1.64-1.56, 1.50-1.45, 1.33-1.30), —CH$_2$—Si (0.54-0.49), Si—CH$_3$ (0.08-0.03). | N—C=O—NH, NH—CO—O (158.21, 157.45), —HC=CH$_2$ (134.31), —HC=CH$_2$ (116.82), —CH$_2$O—CO (67.61), N—CH$_2$—HC=CH$_2$ (49.43), —CH$_2$—NH—C=O—O CH$_2$—NH—C=O—N (41.39, 40.66), —CH$_2$— (30.73, 30.51, 26.49), —CH$_2$—(23.32), Si—CH$_2$— (14.38), Si—CH$_3$ (1.46-0.48). |
| 14 (comparative) | 16500 | Olefinic (5.83-5.73, 5.19-5.13 ppm), NH (4.63, 4.43), —CH$_2$OOC (3.99-3.96), —CH$_2$—CH=CH$_2$ (3.84-3.82), —CH$_2$—OH (3.60-3.56), —CH$_2$—NHCO (3.20-3.11), —CH$_2$— (1.64-1.56, 1.50-1.47, 1.33-1.30), —CH$_2$—Si (0.54-0.49), Si—CH$_3$ (0.10-0.02). | N—C=O—NH, NH—CO—O (158.41, 157.39), —HC=CH$_2$ (134.49), —HC=CH$_2$ (116.71), —CH$_2$O—CO (67.85), N—CH$_2$—HC=CH$_2$ (49.62), —CH$_2$—NH—C=O—O CH$_2$—NH—C=O—N (41.47, 40.82), —CH$_2$— (30.59, 30.29, 26.42), —CH$_2$—(23.41), Si—CH$_2$— (14.17), Si—CH$_3$ (1.43-0.44). |
| 15 (comparative) | 17500 | Olefinic (5.83-5.73, 5.18-5.13 ppm), NH (4.63, 4.43), —CH$_2$OOC (3.99-3.96), —CH$_2$—CH=CH$_2$ (3.84-3.82), —CH$_2$—OH (3.60-3.56), —CH$_2$—NHCO (3.16-3.11), —CH$_2$— (1.64-1.56, 1.49-1.45, 1.33-1.30), —CH$_2$—Si (0.54-0.49), Si—CH$_3$ (0.09-0.02). | N—C=O—NH, NH—CO—O (158.69, 157.52), —HC=CH$_2$ (134.75), —HC=CH$_2$ (116.93), —CH$_2$O—CO (67.79), N—CH$_2$—HC=CH$_2$ (49.64), —CH$_2$—NH—C=O—O CH$_2$—NH—C=O—N (41.58, 40.97), —CH$_2$— (30.63, 30.27, 26.54), —CH$_2$—(23.62), Si—CH$_2$— (14.28), Si—CH$_3$ (1.46-0.42). |
| 16 (comparative) | 16900 | Olefinic (5.83-5.73, 5.19-5.14 ppm), NH (4.63, 4.43), —CH$_2$OOC (3.99-3.96), —CH$_2$—CH=CH$_2$ (3.84-3.82), —CH$_2$—OH (3.60-3.56), —CH$_2$—NHCO (3.20-3.11), —CH$_2$— (1.64-1.56, 1.49-1.45, 1.33-1.30), —CH$_2$—Si (0.54-0.49), Si—CH$_3$ (0.08-0.03). | N—C=O—NH, NH—CO—O (158.57, 157.31), —HC=CH$_2$ (134.42), —HC=CH$_2$ (116.93), —CH$_2$O—CO (67.45), N—CH$_2$—HC=CH$_2$ (49.52), —CH$_2$—NH—C=O—O CH$_2$—NH—C=O—N (41.17, 40.79), —CH$_2$— (30.69, 30.43, 26.58), —CH$_2$—(23.27), Si—CH$_2$— (14.26), Si—CH$_3$ (1.45-0.46). |

TABLE 2-continued

Copolymer Characterization Results

| Example | Molecular Weight (Mn) (g/mol) | $^1$H-NMR analysis | $^{13}$C-NMR analysis |
|---|---|---|---|
| 17 (comparative) | 16500 | Olefinic (5.88-5.80, 5.25-5.10 ppm), NH (4.91, 4.36), —CH$_2$OOC (4.19-4.17), COO—CH$_2$—C(Et)— (4.00), {Vi—CH$_2$}$_2$—O— (3.93-3.90), —CH$_2$—OCH$_2$CH$_2$O—CH$_2$— —CH$_2$—O—C$_3$H$_6$—Si (3.71-3.58), —O—CH$_2$—C$_3$H$_6$—Si (3.42-3.38), {Allyl-O—CH$_2$}$_2$— (3.29), —CH$_2$—NHCO (3.16-3.11), —CH$_2$— (1.63-1.55, 1.48-1.45, 1.32-1.29), C—CH$_2$—CH$_3$ (0.86-0.82), C—CH$_2$—Si (0.52-0.48), Si—CH$_3$ (0.08-0.03). | NH—CO—O (158.76), —HC=CH$_2$ (135.27), —HC=CH$_2$ (116.37), O—CH$_2$—C$_2$H$_4$—Si (74.14), Vi-CH$_2$—O (72.37), —(O—CH$_2$—CH$_2$)$_n$—O— (70.72), Allyl-O—CH$_2$— (69.80), CH$_2$—(O—C$_2$H$_4$)$_n$—O—CH$_2$— (69.19), =C—CH$_2$—O—CO—NH— 65.09, CH$_2$—CH$_2$—(O—C$_2$H$_4$)$_n$—O—CH$_2$—CH$_2$— (63.89), OC—O—CH$_2$—CH$_2$—O—C$_3$H$_6$—Si (61.69), Et—C≡ (42.65), C$_4$H$_8$—CH$_2$—NH—C=O—O (41.94, 41.56), —CH$_2$— (30.69, 26.47) 26.58), —CH$_2$—CH$_2$—O—Si (23.51), CH$_3$—CH$_2$—C≡ (23.09), Si—CH$_2$— (14.23), CH$_3$—CH$_2$—C≡ (7.79), Si—CH$_3$ (1.16-0.27). |
| 18 (comparative) | 17900 | Aromatic (7.74-7.71, 7.29-7.20, 7.08-7.03, 6.71-6.68, 6.46-6.38), Olefinic (5.90-5.80, 5.25-5.10 ppm), —CH$_2$OOC (4.28-4.25, COO—CH$_2$—C(Et) — (4.12), {Vi-CH$_2$}$_2$—O— (3.93-3.92), Ph—CH$_2$—Ph (3.89-3.85), —CH$_2$—OCH$_2$CH$_2$O—CH$_2$— —CH$_2$—O—C$_3$H$_6$—Si (3.71-3.58), —O—CH$_2$—C$_3$H$_6$—Si (3.45-3.41), {Allyl-O—CH$_2$}$_2$— (3.33), —CH$_2$—NHCO (3.16-3.11), —CH$_2$— (1.65-1.58), C—CH$_2$—CH$_3$ (1.48-1.42), C—CH$_2$—CH$_3$ (0.88-0.84), C—CH$_2$—Si (0.54-0.49), Si—CH$_3$ (0.08-0.03). | NH—CO—O (154.40, 154.02), Aromatic (137.20-136.02), HC=CH$_2$ (135.30), Aromatic (133.97, 132.55, 132.31, 130.69, 129.49, 127.54, 125.11, 123.46, 123.35, 119.28), —HC=CH$_2$ (116.65), O—CH$_2$—C$_2$H$_4$—Si (74.31), Vi—CH$_2$—O (72.53), —(O—CH$_2$—CH$_2$)$_n$—O— (70.74), Allyl-O—CH$_2$— (69.68), —CH$_2$—(O—C$_2$H$_4$)$_n$—O—CH$_2$— (69.13), =C—CH$_2$—O—CO—NH— 65.70, —CH$_2$—CH$_2$—(O—C$_2$H$_4$)$_n$—O—CH$_2$—CH$_2$— —OC—O—CH$_2$—CH$_2$—O—C$_3$H$_6$—Si (64.62, 64.31), —OC—O—CH$_2$—CH$_2$—O—C$_3$H$_6$—Si (61.97, 61.78), Et—C≡ 42.78, —Ph—CH$_2$—Ph— (40.84, 37.27), —CH$_2$—CH$_2$—Si (23.65), CH$_3$—CH$_2$—C≡ (23.25), —CH$_2$—Si (14.38), CH$_3$—CH$_2$—C≡ (7.94), Si(CH$_3$)$_2$ (1.30-0.4). |

Samples of the copolymers described above were crosslinked.

Example 19—Composition Using the Copolymer of Example 1 (IPDI$_2$C21AA$_2$) and Different SH Crosslinkers A 2.5 g sample of the copolymer of Example 1 was placed in a cup and 0.213 g of a crosslinker was added to it. 0.1 wt % of Darocur 1173 (photoinitiator) was added to the cup, and the contents of the cup were hand mixed followed by mixing for 25 sec at 3000 rpm. The resulting composition was poured on a polyurethane sheet reinforced on Mylar, and a laminate was prepared using a 15 mil thick chase. This laminate was cured in a UV chamber for a period of time. A blue LDPE release liner was then rolled over the cured laminate, and the laminate was kept overnight at room temperature before it was tested for adhesion, release and cohesive strength. Each laminate was tested on the Texture Analyzer as per the following procedure.

For the release measurement, the release liner was secured in the bottom clamp, and the adhesive coated polyurethane laminate was secured in the top clamp. The clamps were pulled apart at 10 mm/s for 130 mm. The value reported for each strip was the average force (N)/in to pull the release liner from the adhesive coated polyurethane laminate. The data from the first 20 mm and the last 10 mm were discarded, and the data from the remaining 100 mm was averaged. One to three replicates were tested to generate the value reported in the table in Newtons per (linear) inch (N/in). The final reported value is the average of the 1 to 3 test strips (1 inch=~25 mm).

For the adhesion measurement, the release liner was removed from the coated test strip, and the test strip was adhered to the frosted side of a 1.5 in x 9 in (3.8 cm×23 cm) strip of polycarbonate. With the use of a 5 lb rubber coated roller, the adhesive strip was applied to the polycarbonate with one stroke forward and one stroke back at a rate of 1 in/sec (2.5 cm/sec). The sample was allowed to remain in contact with the polycarbonate for 30 minutes. During the test, the polycarbonate was secured in the bottom clamp, while the adhesive coated polyurethane was secured in the top clamp. As in the release test, the clamps were pulled apart at 10 mm/s for 130 mm. The force to pull the adhesive coated polyurethane (1 in wide) from the polycarbonate was averaged over 100 mm (excluding the first 20 mm and last 10 mm of the 130 mm pull) with the final measurement in Newtons per (linear) inch (N/in). The final reported value was the average of 1 to 3 test strips.

Percent cohesive failure was approximated by visually estimating the amount of adhesive remaining on the polycarbonate after testing for adhesion. When possible a distinction was made between cohesively failing through the adhesive (true cohesive failure) versus transferring from the polyurethane substrate to the polycarbonate (adhesive failure at the substrate). Any adhesive remaining on the polycarbonate was referred to as indicating cohesive failure.

Samples of compositions were prepared as above using the copolymer of Example 1 but varying SH:Vi ratio, SH cross linkers (SMS 142 and SMS 042), amounts of photoinitiator, and cure time. Laminates were prepared from all these compositions, which were tested on the Texture Analyzer for adhesion, release and cohesive strength as described above. The crosslinker used and amount of photoinitiator, as well as the test results, are shown below in Table 3.

Example 20—Composition Using the Copolymer of Example 4 (IPDI$_2$C23$_1$ AA$_2$) and SMS 142 SH Cross Linker Example 19 was repeated, except a 2 g sample of the copolymer of Example 4 was placed in a cup with the 0.223 g of crosslinker and Darocur 1173. The laminates were tested on the Texture Analyzer following the procedure described in Example 19.

Samples of compositions were prepared as above using the copolymer of Example 4 but varying SH:Vi ratio, SH cross linkers (SMS 142 and SMS 042), amounts of photoinitiator, and cure time. Laminates were prepared from all these compositions, which were tested on the Texture Analyzer for adhesion, release and cohesive strength as described above. The crosslinker used and amount of photoinitiator, as well as the test results, are shown below in Table 3.

Example 21—Compositions Using the Copolymer of Example 11 (HDI$_3$C21$_2$ DA$_2$) and SMS 142 and SMS 042 SH Cross Linkers Example 19 was repeated, except a 2 g of sample of the copolymer of Example 11 (HDI$_3$C21$_2$DA$_2$) was placed in the cup, and 0.433 gm of crosslinker was added to it. The laminates were tested on the Texture Analyzer following the procedure described in Example 19.

Samples of compositions were prepared as above using the copolymer of Example 11 but varying SH:Vi ratio, SH cross linkers (SMS 142 and SMS 042), amounts of photoinitiator, and cure time. Laminates were prepared from all these compositions, which were tested on the Texture Analyzer for adhesion, release and cohesive strength as described above. The crosslinker used and amount of photoinitiator, as well as the test results, are shown below in Table 3.

Example 22—Composition Using the Copolymer of Example 5 (IPDI$_3$C21$_2$AOH$_2$) and SMS 142 and SMS 042 and SMS142 Mixed SH Cross Linkers Example 19 was repeated except a 2 g sample of the copolymer of Example 5 was placed in the cup with either one crosslinker or a combination of crosslinkers. The laminates were tested on the Texture Analyzer following the procedure described in Example 19.

Samples of compositions were prepared as above using the copolymer of Example 5 but varying SH:Vi ratio, SH cross linkers (SMS 142 and SMS 042), amounts of photoinitiator, and cure time. Laminates were prepared from all these compositions, which were tested on the Texture Analyzer for adhesion, release and cohesive strength as described above. The crosslinker used and amount of photoinitiator, as well as the test results, are shown below in Table 3.

Example 23—Compositions Using the Copolymer of Example 12 HDI$_7$C21$_6$ DA$_2$ Copolymer and SMS 142 SH Cross Linker Samples were prepared as in Example 19, except the copolymer added to the cup was replaced with 5 g of the copolymer of Example 12 (HDI$_7$C21$_6$DA$_2$) and 0.0500 g of SMS142 SH crosslinker was added to it. The laminates were tested on the Texture Analyzer following the procedure described in Example 19.

Samples of compositions were prepared as above using the copolymer of Example 12 but varying SH:Vi ratio, SH cross linkers (SMS 142 and SMS 042), amounts of photoinitiator, and cure time. Laminates were prepared from all these compositions, which were tested on the Texture Analyzer for adhesion, release and cohesive strength as described above. The crosslinker used and amount of photoinitiator, as well as the test results, are shown below in Table 3.

Example 24—Compositions Using the Copolymer of Example 13 HDI$_{10}$C16$_9$ DA$_2$ Copolymer with SMS142 SH Cross Linker Samples were prepared as in Example 19, except that 8 g of the copolymer of Example 13 (HDI$_{10}$C16$_9$DA$_2$) and 1.7305 g of SMS142 SH crosslinker were added to the cup. The laminates were tested on the Texture Analyzer following the procedure described in Example 19.

Samples of compositions were prepared as above using the copolymer of Example 13 but varying SH:Vi ratio and cure time. Laminates were prepared from all these compositions, which were tested on the Texture Analyzer for adhesion, release and cohesive strength as described above. The crosslinker used and amount of photoinitiator, as well as the test results, are shown below in Table 3.

Example 25—Compositions Using the Copolymer of Example 7 HDI$_{20}$C21$_{19}$DA$_2$ Copolymer with SMS142 SH Cross Linker Example 19 was repeated, except that 8 g of the copolymer of Example 7 (HDI$_{20}$C21$_{19}$DA$_2$) and 0.0662 m of SMS142 SH crosslinker were added to the cup The laminates were tested on the Texture Analyzer following the procedure described in Example 19.

Samples of compositions were prepared as above using the copolymer of Example 7 but varying SH:Vi ratio. Laminates were prepared from all these compositions, which were tested on the Texture Analyzer for adhesion, release and cohesive strength as described above. The crosslinker used and amount of photoinitiator, as well as the test results, are shown below in Table 3.

Example 26—Compositions Using the Copolymer of Example 14 HDI$_{15.75}$C16$_{14.75}$DA$_2$ Copolymer with SMS142 SH Cross Linker and Series of Acrylates Crosslinkers Samples were prepared as in Example 19, except that 2.5 g of the Copolymer of Example 14 HDI$_{15.75}$C16$_{14.75}$DA$_2$ and 0.1250 g of pentaerythritol tetraacrylate crosslinker were added to the cup. The laminates were tested on the Texture Analyzer following the procedure described in Example 19.

Samples of compositions were prepared as above using the copolymer of Example 14 but varying the crosslinker selection and amount, the cure time, and SH:Vi ratio. Laminates were prepared from all these compositions, which were tested on the Texture Analyzer for adhesion, release and cohesive strength as described above. The crosslinker used and amount of photoinitiator, as well as the test results, are shown below in Table 3.

Example 27—Compositions Using the Copolymer of Example 15 HDI$_{16.6}$C16$_{15.6}$DA$_2$ Copolymer with Pentaerythritol Tetraacrylate Crosslinker A 2.5 g sample of the copolymer of Example 15 (HDI$_{16.6}$C16$_{15.6}$DA$_2$) was taken in a dental mixer cup and 0.1250 gm of pentaerythritol tetraacrylate crosslinker was added to it. 0.1 wt % of Darocur 1173 (photoinitiator) was added to the mixture and the mixture was hand mixed with a spatula followed by a dental mixer mixing for 25 sec at 3000 rpm. This formulation was then poured on a polyurethane sheet reinforced on Mylar and a laminate was prepared using a 15 mil thick chase. This laminate was cured in a UV chamber until completely cured. A blue LDPE release liner was then rolled over the cured laminate and the laminate was kept overnight at room temperature before it was tested for adhesion, release and cohesive strength. The laminates were tested on the Texture Analyzer following the procedure described in Example 19.

Compositions were prepared using this copolymer of Example 15 and acrylate while changing the amount of acrylate and photoinitiator. Laminates were prepared and cured in UV chamber until fully cured and tested on TA for adhesion and release. The crosslinker used and amount of photoinitiator, as well as the test results, are shown below in Table 3.

Example 28—Compositions Using the Copolymer of Example 16 $HDI_{15}C16_{14}DA_2$ Copolymer with SMS142 and 26298-125 Dow Corning SH Cross Linkers Samples were prepared as in Example 19, except that 5 g of the copolymer of Example 16 ($HDI_{15}C16_{14}DA_2$) and 0.6409 g of 26298-125 Dow Corning SH crosslinker were added to the cup. The laminates were tested on the Texture Analyzer following the procedure described in Example 19.

Samples of compositions were prepared as above using the copolymer of 16 but varying SH:Vi ratio, SH cross linkers, amounts of photoinitiator, and cure time. Laminates were prepared from all these compositions, which were tested on the Texture Analyzer for adhesion, release and cohesive strength as described above. The crosslinker used and amount of photoinitiator, as well as the test results, are shown below in Table 3.

TABLE 3

Copolymer Crosslinking Conditions and Adhesion Test Results

| Example | SH:Vi molar ratio | Photoinitiator % | Crosslinker | Cure Time (sec) | Adhesion (N/in) | Release (N/in) |
|---|---|---|---|---|---|---|
| 19 | 1 | 0.1 | XX-3035 | 5 | 0.027 | 0.000 |
| 19 | 1 | 1 | XX-3035 | 10 | 0.140 | 0.000 |
| 19 | 1 | 0.1 | SMS142 | 10 | 0.651 | 0.028 |
| 19 | 1 | 1 | SMS142 | 5 | 0.483 | 0.011 |
| 19 | 1 | 0.1 | XX-3035 | 5 | 0.444 | 0.004 |
| 19 | 1 | 1 | XX-3035 | 5 | 0.195 | 0.000 |
| 19 | 1 | 0.1 | SMS142 | 5 | 0.701 | 0.057 |
| 19 | 1 | 1 | SMS142 | 5 | 2.340 | 0.016 |
| 19 | 1 | 0.1 | SMS042 | 55 | 0.580 | 0.009 |
| 19 | 1 | 1 | SMS042 | 40 | 0.971 | 0.011 |
| 19 | 1 | 1 | SMS142 | 5 | 1.043 | 0.029 |
| 19 | 1.1 | 1 | SMS142 | 5 | 1.862 | 0.045 |
| 19 | 1.2 | 1 | SMS142 | 5 | 1.666 | 0.032 |
| 19 | 1.3 | 1 | SMS142 | 5 | 1.329 | 0.042 |
| 19 | 1.4 | 1 | SMS142 | 5 | 1.534 | 0.020 |
| 19 | 1.5 | 1 | SMS142 | 5 | 1.282 | 0.015 |
| 19 | 1.4 | 1 | SMS142 | 3 | 0.837 | 0.034 |
| 19 | 1.4 | 1 | SMS142 | 7 | 0.611 | 0.027 |
| 19 | 1.4 | 1 | SMS142 | 10 | 0.221 | 0.003 |
| 20 | 1.3 | 1 | SMS142 | 5 | 0.333 | 0.061 |
| 20 | 1.4 | 1 | SMS142 | 5 | 0.776 | 0.025 |
| 20 | 1.5 | 1 | SMS142 | 5 | 0.279 | 0.01 |
| 20 | 1.1 | 1 | SMS142 | 5 | 0.651 | 0.082 |
| 20 | 1.1 | 1 | SMS142 | 5 | 1.306 | 0.039 |
| 20 | 1.1 | 1 | SMS142 | 15 | 0.084 | 0.005 |
| 20 | 1.2 | 1 | SMS142 | 5 | 0.963 | 0.045 |
| 20 | 1.2 | 1 | SMS142 | 15 | 0.125 | 0.011 |
| 20 | 1.4 | 1 | SMS142 | 5 | 1.547 | 0.035 |
| 20 | 1.4 | 1 | SMS142 | 15 | 0.051 | 0.007 |
| 21 | 0.9 | 1 | SMS142 | 7 | 0.109 | 0.007 |
| 21 | 0.9 | 1 | SMS142 | 15 | 0.019 | 0.003 |
| 21 | 1 | 1 | SMS142 | 7 | 0.090 | 0.008 |
| 21 | 1 | 1 | SMS142 | 15 | 0 | 0 |
| 21 | 1.1 | 1 | SMS142 | 7 | 0.022 | 0.001 |
| 21 | 0.3 | 1 | SMS042 | 30 & 40 | 0.524 | 0.105 |
| 21 | 0.3 | 1 | 26298-125 | 60 & 80 | 2.810 | 0.156 |
| 22 | 1 | 1 | SMS142 | 7 | NA | NA |
| 22 | 1.1 | 1 | SMS142 | 7 | NA | NA |
| 22 | 1.2 | 1 | SMS142 | 7 | NA | NA |
| 22 | 1.3 | 1 | SMS142 | 7 | NA | NA |
| 22 | 1.4 | 1 | SMS142 | 7 | NA | NA |
| 22 | 1.5 | 1 | SMS142 | 7 | NA | NA |
| 22 | 1 | 1 | 3 SMS142:1 SMS042 * | 10 | NA | NA |
| 22 | 1 | 1 | 2 SMS142:1 SMS042 * | 10 | NA | NA |
| 22 | 1 | 1 | 1 SMS142:1 SMS042 * | 13 | NA | NA |
| 22 | 1 | 1 | 0.5 SMS142:1 | 17 | NA | NA |

TABLE 3-continued

Copolymer Crosslinking Conditions and Adhesion Test Results

| Example | SH:Vi molar ratio | Photoinitiator % | Crosslinker | Cure Time (sec) | Adhesion (N/in) | Release (N/in) |
|---|---|---|---|---|---|---|
| 23 | 0.9 | 1 | SMS042 * SMS142 | 7 | NA | NA |
| 23 | 1 | 1 | SMS142 | 7 | NA | NA |
| 23 | 1.1 | 1 | SMS142 | 7 | NA | NA |
| 23 | 0.3 | 1 | SMS142 | 10 | NA | NA |
| 23 | 0.5 | 1 | SMS142 | 7 | NA | NA |
| 23 | 0.7 | 1 | SMS142 | 7 | NA | NA |
| 23 | 0.5 | 1 | SMS142 | 15 | 0.932 | 0.038 |
| 23 | 0.7 | 1 | SMS142 | 15 | 0.340 | 0.014 |
| 23 | 0.9 | 1 | SMS142 | 15 | 0.177 | 0.008 |
| 23 | 0.1 | 1 | SMS142 | 70 & 160 | NA | 0.437 |
| 24 | 0.25 | 1 | SMS142 | 30 | 1.071 | 0.07 |
| 24 | 0.9 | 1 | SMS142 | 60 | 2.019 | 0.890 |
| 24 | 1 | 1 | SMS142 | 60 & 70 | 1.850 | 0.618 |
| 24 | 1.1 | 1 | SMS142 | 50 & 60 | 2.742 | 0.436 |
| 24 | 0.3 | 1 | SMS142 | 90 & 105 | 0.282 | 0.037 |
| 24 | 0.5 | 1 | SMS142 | 60 | 0.279 | 0.028 |
| 24 | 0.7 | 1 | SMS142 | 60 | 0.354 | 0.037 |
| 25 | 0.3 | 1 | SMS142 | 30 | NA | NA |
| 25 | 0.5 | 1 | SMS142 | NA | NA | NA |
| 25 | 0.7 | 1 | SMS142 | NA | NA | NA |
| 25 | 0.9 | 1 | SMS142 | NA | NA | NA |
| 25 | 1 | 1 | SMS142 | NA | NA | NA |
| 26 | 0.9 | 1 | SMS142 | 15 | NA | NA |
| 26 | 1 | 1 | SMS142 | 15 | NA | NA |
| 26 | 1.1 | 1 | SMS142 | 15 | NA | NA |
| 26 | 0.3 | 1 | SMS142 | 90 | 4.365 | 2.818 |
| 26 | 0.5 | 1 | SMS142 | 15 | NA | NA |
| 26 | 0.7 | 1 | SMS142 | 15 | NA | NA |
| 26 | 0.7 | 1 | SMS142 | 15 | 3.257 | 2.147 |
| 26 | 0.9 | 1 | SMS142 | 15 | 3.903 | 0.698 |
| 26 | 1 | 1 | SMS142 | 15 | 3.186 | 0.728 |
| 26 | 0.7 | 1 | SMS142 | 15 | 4.115 | 2.335 |
| 26 | 0.9 | 1 | SMS142 | 15 | 3.882 | 0.470 |
| 26 | 1 | 1 | SMS142 | 15 | 3.412 | 0.210 |
| 26 | 0.7 | 1 | SMS142 | 30 | 2.596 | 0.128 |
| 26 | 0.9 | 1 | SMS142 | 30 | 2.097 | 0.063 |
| 26 | 1 | 1 | SMS142 | 30 | 2.024 | 0.046 |
| 26 | 0.9 | 1 | 26298-125 | 60 & 80 | 3.448 | 0.140 |
| 26 | 1 | 1 | 26298-125 | 60 & 85 | 3.3 | 0.162 |
| 26 | 0.3 | 1 | 26298-125 | 80 & 85 | 6.264 | 2.142 |
| 26 | 0.5 | 1 | 26298-125 | 60 & 65 | 4.274 | 0.161 |
| 26 | 0.7 | 1 | 26298-125 | 60 & 65 | 3.463 | 0.041 |
| 27 | NA | 0.5 | 5 wt % Tetraacrylate | 480 | 3.841 | 0.136 |
| 27 | NA | 2 | 5 wt % Tetraacrylate | 90 | 1.574 | 0.024 |
| 27 | NA | 0.5 | 7 wt % Tetraacrylate | 480 | 2.257 | 0.084 |
| 27 | NA | 2 | 7 wt % Tetraacrylate | 60 | 1.561 | 0.034 |
| 28 | 0.3 | 1 | SMS142 | 300 | 0.907 | 0.6 |
| 28 | 0.3 | 1 | SMS142 | 240 | 5.261** | 0.3 |
| 28 | 0.4 | 1 | SMS142 | 150 | 0.569 | 0.439 |
| 28 | 1 | 1 | SMS142 | 240 | 0.982 | 0.1 |

* Where a ratio is presented, this is a weight ratio of different crosslinkers used in the composition.
**20% cohesive failure was observed for this sample.

INDUSTRIAL APPLICABILITY

Without wishing to be bound by theory, it is thought that using c) the endblocker having an average of more than one unsaturated group per molecule in the method for preparing the polyurethane-polyorganosiloxane copolymer described herein may provide an unexpected benefit over similar methods wherein the endblocker has no more than 1 unsaturated group per moleculein that the copolymer is easier to synthesize. Furthermore, it is thought that polyurethane-polyorganosiloxane copolymer having an average of greater than one unsaturated group at a terminus of the copolymer will be easier to crosslink than polyurethane-polyorganosiloxane copolymers having no more than 1 unsaturated group at each terminus.

As seen from the results, these polyurethane-polyorganosiloxane copolymers are very easy to crosslink when a suitable crosslinker and a suitable photoinitiator are used. Also the reaction products formed, e.g., crosslinked gels, show high adhesion to polycarbonate and polyurethane. Note that since polyurethane is used as the substrate from which the adhesion to polycarbonate is measured, the adhesion to polyurethane is stronger than the adhesion strength data shown in the table for polycarbonate. Furthermore, these suitable gels show very low release force from low density polyethylene, which is very desirable and difficult to achieve with pure silicone compositions when the composition is tuned to have comparably high adhesion to polycarbonate. Without wishing to be bound by theory, it is thought that using the above described polyurethane-polyorganosiloxane copolymers in adhesive applications provides the benefit that release liners without expensive fluorosilicone coatings can be used.

Furthermore, the examples and preparation methods described herein may provide one or more of the following benefits: solventless preparation methods for the copolymer that minimize unwanted side reactions, compositions that will enable easier and more repeatable crosslinking when a very low crosslink density soft gel is to be prepared. And new copolymer structures and their combination with novel crosslinking reactions are needed that will allow for better balancing cohesive and adhesive strengths, release force from a substrate, and the need to incorporate a wide range of active medicines.

Definitions and Usage of Terms

All amounts, ratios, and percentages are by weight unless otherwise indicated. The articles 'a', 'an', and 'the' each refer to one or more, unless otherwise indicated by the context of specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, an alkynyl group, and an aryl group, an includes the member alkyl individually; the subgroup alkyl and aryl; and any other individual member and subgroup subsumed therein.

"Alkyl" means a saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl); hexyl, heptyl, octyl, nonyl, and decyl, as well as branched saturated monovalent hydrocarbon groups of 6 or more carbon atoms.

"Alkenyl" means a monovalent hydrocarbon group containing a double bond. Alkenyl groups are exemplified by, but not limited to, ethenyl, propenyl (e.g., iso-propenyl and/or n-propenyl), butenyl (e.g., isobutenyl, n-butenyl, tert-butenyl, and/or sec-butenyl), pentenyl (e.g., isopentenyl, n-pentenyl, and/or tert-pentenyl), hexenyl, heptenyl, octenyl, nonenyl, and decenyl, as well as such branched groups of 6 or more carbon atoms.

"Alkynyl" means a monovalent hydrocarbon group containing a triple bond. Alkynyl groups are exemplified by, but not limited to, ethynyl, propynyl (e.g., iso-propynyl and/or n-propynyl), butynyl (e.g., isobutynyl, n-butynyl, tert-butynyl, and/or sec-butynyl), pentynyl (e.g., isopentynyl, n-pentynyl, and/or tert-pentynyl), hexynyl, heptynyl, octynyl, nonynyl, and decynyl, as well as such branched groups of 6 or more carbon atoms.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 18 carbon atoms, alternatively 10 to 14 carbon atoms, and alternatively 12 to 14 carbon atoms.

"Aralkyl" means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl.

"Carbocycle" and "carbocyclic" each mean a hydrocarbon ring. Carbocycles may be monocyclic or alternatively may be fused, bridged, or spiro polycyclic rings. Monocyclic carbocycles may have 3 to 9 carbon atoms, alternatively 4 to 7 carbon atoms, and alternatively 5 to 6 carbon atoms. Polycyclic carbocycles may have 7 to 18 carbon atoms, alternatively 7 to 14 carbon atoms, and alternatively 9 to 10 carbon atoms. Carbocycles may be saturated or partially unsaturated.

"Cycloalkyl" means saturated carbocycle. Monocyclic cycloalkyl groups are exemplified by cyclobutyl, cyclopentyl, and cyclohexyl.

Collectively, the term "monovalent hydrocarbon group" includes alkyl, alkenyl, aryl, aralkyl, and carbocyclic groups, as defined above.

Divalent hydrocarbon group includes alkylene groups such as ethylene, propylene (including isopropylene and n-propylene), and butylene (including n-butylene, t-butylene and isobutylene); and pentylene, hexylene, heptylene, octylene, and branched and linear isomers thereof; arylene groups such as phenylene; and alkaralkylene groups such as:

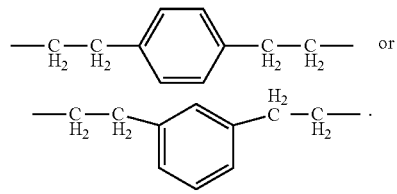

Alternatively, each divalent hydrocarbon group may be ethylene, propylene, butylene or hexylene. Alternatively, each divalent hydrocarbon group may be ethylene or propylene.

"Halogenated hydrocarbon" means a hydrocarbon group as defined above, but where one or more hydrogen atoms bonded to a carbon atom have been formally replaced with a halogen atom. For example, monovalent halogenated hydrocarbon groups can be any one of alkyl, alkenyl, aryl, aralkyl, and carbocyclic groups in which one or more hydrogen atoms bonded to a carbon atom have been replaced with a halogen atom. Monovalent halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4, 3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include chloro allyl.

The invention claimed is:

1. A polyurethane-polyorganosiloxane copolymer comprising formula:

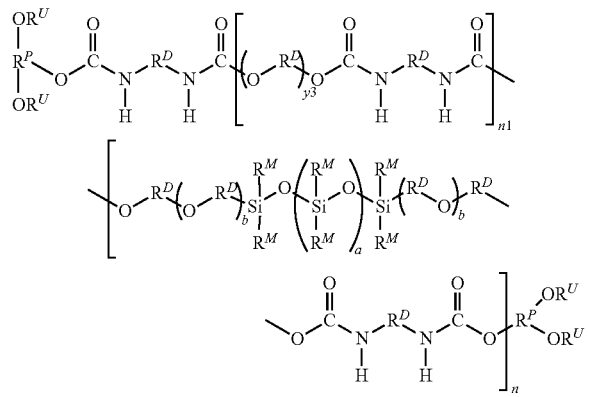

where
each $R^U$ is independently an alkenyl group of 2 to 13 carbon atoms;
each $R^D$ is independently an alkylene group of 2 to 13 carbon atoms;
each $R^P$ is a trivalent hydrocarbon group or a trivalent halogenated hydrocarbon group;
each subscript b is independently 0 or 1;
each subscript a is independently 0 to 100,000; and subscript n is 1 to 10,000
each subscript y3 is independently 1 to 200,000; and subscript n1 is 1 to 1,500,000.

2. A crosslinkable composition comprising:
(A) the copolymer of claim 1, and
(B) a curing catalyst.

3. The crosslinkable composition of claim 2, further comprising (C) a crosslinker.

4. The crosslinkable composition of claim 3, where (C) the crosslinker is selected from (C1) an acrylate crosslinker, (C2) a crosslinker containing alkenyl groups other than in an acrylate group, (C3) a thiol functional crosslinker, or (C4) an SiH containing crosslinker.

* * * * *